United States Patent
Dang et al.

(10) Patent No.: US 12,436,807 B2
(45) Date of Patent: Oct. 7, 2025

(54) DATA PROCESSING SYSTEMS FOR A COMMAND STREAM

(71) Applicant: Arm Limited, Cambridge (GB)

(72) Inventors: Maochang Dang, Cambridge (GB); Espen Amodt, Cambridge (GB); Anton Berko, Cambridge (GB)

(73) Assignee: Arm Limited, Cambridge (GB)

( * ) Notice: Subject to any disclaimer, the term of this patent is extended or adjusted under 35 U.S.C. 154(b) by 492 days.

(21) Appl. No.: 18/174,283

(22) Filed: Feb. 24, 2023

(65) Prior Publication Data
US 2023/0297428 A1    Sep. 21, 2023

(30) Foreign Application Priority Data
Feb. 25, 2022 (GB) ..................... 2202602

(51) Int. Cl.
*G06F 9/50* (2006.01)
*G06F 9/48* (2006.01)

(52) U.S. Cl.
CPC .......... *G06F 9/5027* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 8,056,093 B1 * | 11/2011 | McClure | G06T 1/20 345/522 |
| 10,732,978 B2 * | 8/2020 | Underwood | G06F 9/30047 |
| 2010/0102734 A1 * | 4/2010 | Quick | H05B 47/18 315/312 |
| 2011/0242119 A1 * | 10/2011 | Bolz | G06T 1/00 345/522 |
| 2014/0022266 A1 * | 1/2014 | Metz | G06F 9/461 345/522 |
| 2014/0184623 A1 * | 7/2014 | Frascati | G06T 1/20 345/522 |
| 2014/0259016 A1 * | 9/2014 | Lottes | G06F 9/4881 718/102 |

(Continued)

OTHER PUBLICATIONS

Combined Search Report and Examination Report under Sections 17 and 18(3) dated Oct. 20, 2022, GB Patent Application No. GB2202602.5.

Kejnar, F.F., "Generating Rendering Commands on Graphics Cards", 2018, XP055965589, URL: https://is.muni.cz/th/tqfo2/ThesisDigital.pdf, pp. 1-4 and 15-26.

Arm Software Developers, "Arm Mali GPU Training Series Ep 1.1: Introduction to mobile systems", Jul. 15, 2021, URL: https://www.youtube.com/watch?v=tnR4mExVCIY&list=PLKjl71FAwc4QUTejaX2vplwXstbgf8Ik7&index=1 the whole document.

(Continued)

*Primary Examiner* — Adam Lee
(74) *Attorney, Agent, or Firm* — Pearl Cohen Zedek Latzer Baratz LLP

(57) ABSTRACT

There is provided a data processing system comprising a host processor and a processing resource operable to perform processing operations for applications executing on the host processor by executing commands within an appropriate command stream. The command stream is generated at least in part by the processing resource itself. The host processor is thus configured to generate a command stream layout indicating a sequence of commands for the command stream that is then provided to the processing resource together with suitable indicators of command stream generation work to cause the processing resource to populate a command stream corresponding to the command stream layout for execution.

20 Claims, 10 Drawing Sheets

(56) References Cited

U.S. PATENT DOCUMENTS

| | | | | |
|---|---|---|---|---|
| 2014/0306971 | A1* | 10/2014 | Frascati | G06T 15/04 |
| | | | | 345/522 |
| 2016/0179714 | A1* | 6/2016 | Acharya | G06F 9/3879 |
| | | | | 711/158 |
| 2017/0109096 | A1* | 4/2017 | Jean | G06F 3/0679 |
| 2018/0109441 | A1* | 4/2018 | Meyer | H04L 65/65 |
| 2019/0080437 | A1* | 3/2019 | Shivakumar | H04N 1/40 |
| 2019/0340722 | A1* | 11/2019 | Aas | G06T 17/20 |
| 2020/0050478 | A1* | 2/2020 | Underwood | G06F 9/4812 |
| 2020/0065095 | A1* | 2/2020 | Underwood | G06F 9/30185 |
| 2020/0065107 | A1* | 2/2020 | Underwood | G06F 9/3814 |
| 2020/0257555 | A1* | 8/2020 | Underwood | G06F 9/3877 |
| 2021/0191771 | A1* | 6/2021 | Mccrary | G06F 12/0835 |
| 2021/0303346 | A1* | 9/2021 | Shahim | G06F 9/4881 |

OTHER PUBLICATIONS

Anonymous, "Descriptor Sets—Vulkan Guide", Jan. 29, 2022, URL: https://web.archive.org/web/20220129043558/https://vkguide.dev/docs/chapter-4/descriptors/ the whole document.

Anonymous, "Draw Indirect—Vulkan Guide", Dec. 2, 2021, URL:https://web.archive.Org/web/20211202150554/https://vkguide.dev/docs/gpudriven/draw indirect/ the whole document.

Anonymous, "Setting up descriptor sets—Vulkan Guide", Dec. 2, 2021, URL:https://web.archive.Org/web/20211202150441/https://vkguide.dev/docs/chapter-4/descriptors code/ the whole document.

* cited by examiner

DATA PROCESSING SYSTEMS FOR A COMMAND STREAM

CROSS-REFERENCE TO RELATED APPLICATIONS

This application claims priority pursuant to 35 U.S.C. 119(a) to United Kingdom Application No. 2202602.5, filed Feb. 25, 2022, which application is incorporated herein by reference in its entirety.

BACKGROUND

The technology described herein relates to data processing systems and in particular to the submission of processing tasks to a processing resource, such as a graphics processor, of a data processing system.

Many data processing systems include processing resources, such as a graphics processor (graphics processing unit (GPU)), that may perform processing tasks for, e.g., applications that are executing on a, e.g., main (e.g. host) processor (CPU) of the data processing system.

The processing resource, e.g. graphics processor, may be caused to perform processing tasks for applications by providing to the processing resource a stream of commands (instructions) to be executed by the processing resource. For example, a driver for the processing resource may prepare a command stream containing commands (instructions) to be performed by the processing resource, and provide the command stream to the processing resource (e.g. graphics processor), with the processing resource then performing the commands (the operations indicated by the commands) in the command stream.

The command stream may, for example, contain commands (instructions) to set parameters for processing tasks, as well as commands (instructions) to execute the processing tasks. The processing resource will then work its way through the command stream, executing the commands (instructions) in the command stream, e.g. in turn.

The Applicants however believe that there remains scope for improvements to the submission of processing tasks for execution to a processing resource, such as a graphics processor, of a data processing system.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
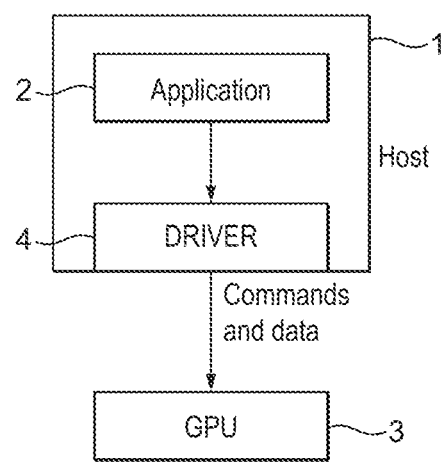
FIG. 1 shows an exemplary graphics processing system.

A first embodiment of the technology described herein comprises a method of operating a data processing system that comprises:

a host processor; and a processing resource operable to perform data processing tasks for applications executing on the host processor;

the method comprising:

preparing on the host processor, in response to a request for data processing to be performed by the processing resource from an application executing on the host processor, a command stream layout, the command stream layout indicating a sequence of commands for a command stream for execution by the processing resource to cause the processing resource to perform processing tasks for the application;

wherein preparing the command stream layout further comprises:

the host processor generating one or more indicators of command stream generation work that is to be performed by the processing resource to populate the command stream corresponding to the command stream layout for execution, which indicators will trigger the processing resource to perform command stream generation work to generate command stream data for inclusion into the command stream corresponding to the command stream layout;

the method further comprising:

the host processor providing the command stream layout and the one or more indicators of command stream generation work to the processing resource;

the processing resource storing a command stream corresponding to the command stream layout in a command stream buffer for execution; and the processing resource executing the commands in the command stream from within the command stream buffer to perform processing tasks for the application;

wherein the processing resource storing a command stream corresponding to the command stream layout in the command stream buffer comprises:

in response to an indicator of command stream generation work to be performed by the processing resource for the command stream corresponding to the command stream layout:

the processing resource performing the indicated command stream generation work to generate command stream data for inclusion into the command stream; and writing the generated command stream data into the command stream in the command stream buffer for execution by the processing resource.

A second embodiment of the technology described herein comprises a data processing system that comprises:

a host processor; and a processing resource operable to perform data processing tasks for applications executing on the host processor;

the host processor comprising a command stream generating circuit that is configured to prepare, in response to a request for data processing to be performed by the processing resource from an application executing on the host processor, a command stream layout, the command stream layout indicating a sequence of commands for a command stream for execution by the processing resource to cause the processing resource to perform processing tasks for the application;

wherein preparing the command stream layout further comprises:

the host processor generating one or more indicators of command stream generation work that is to be performed by the processing resource to populate the command stream corresponding to the command stream layout for execution, which indicators will trigger the processing resource to perform command stream generation work to generate command stream data for inclusion into the command stream corresponding to the command stream layout;

the host processor further comprising a processing circuit configured to provide the command stream layout and the one or more indicators of command stream generation work to the processing resource;

the processing resource comprising:

a command stream buffer for storing a command stream corresponding to a command stream layout provided by the host processor for execution;

a processing circuit configured to, in response to an indicator provided by the host processor of command stream generation work to be performed by the processing resource to populate a command stream corresponding to a command stream layout:

i. perform the indicated command stream generation work to generate command stream data for inclusion into the command stream corresponding to the command stream layout; and ii. write the generated command stream data into the command stream in the command stream buffer for execution by the processing resource; and a command stream execution circuit that is configured to execute commands in the command stream from within the command stream buffer to perform processing tasks for the application.

The technology described herein relates to arrangements in which a processing resource, such as a graphics processor, is operable to execute commands (instructions) in a command stream to perform processing tasks for applications executing on a host processor.

In the technology described herein, rather than the commands (instructions) in the command streams being prepared and the command stream assembled entirely by the host processor, with the processing resource then simply executing the commands in the command stream, as may be the case in more traditional arrangements, the processing resource (e.g. graphics processor) is caused to perform at least some of the command stream assembly itself.

That is, according to the technology described herein, the overall preparation of the command stream is still performed under the control of the host processor, with the host processor preparing and providing a command stream layout to the processing resource. The command stream layout that is provided by the host processor indicates a sequence of commands defining a command stream for execution by the processing resource. The command stream layout thus in an embodiment identifies the order of commands that should be included in the 'full' command stream (the command stream that is to be executed to cause the processing resource to perform the data processing task for the application).

However, the command stream (layout) that is provided to the processing resource in the technology described herein is not yet fully populated (e.g. there are some 'empty' commands, e.g. whose state or parameters have not yet been set, or gaps indicated in the command stream layout where commands should be generated by the processing resource and inserted into the command stream for execution).

Thus, in the technology described herein, in addition to preparing and providing a command stream layout for a command stream to be executed by the processing resource, the host processor also generates, and provides to the processing resource, appropriate indicators of command stream generation work, which indicators will cause (trigger) the processing resource to perform command stream generation work in order to populate the command stream corresponding to the command stream layout for execution. When the command stream layout is provided to the processing resource, and the processing resource is caused to store a command stream corresponding to the command stream layout in a suitable command stream buffer (from which the commands in the command stream are then executed), the processing resource is thus also caused to perform further command stream generation work in order to populate the 'full' command stream corresponding to the command stream layout for execution.

In other words, in the technology described herein, the host processor prepares and provides a command stream layout which in embodiments is effectively a 'framework' for the full command stream, and which command stream layout is then populated at least in part with command stream data that is generated by the processing resource to thereby assemble the final, full command stream for execution.

The command stream corresponding to the command stream layout could in some embodiments be entirely populated by the processing resource. That is, the host processor could prepare only a skeleton command stream layout, for example, indicating the order that a set of commands in a command stream for the processing resource should have, but the actual command stream data for populating the executable commands in the command stream being generated entirely by the processing resource.

In embodiments, however, the command stream corresponding to the command stream layout that is provided by the host processor also contains at least some executable commands that have been prepared in full by the host processor, e.g. in a form that can be immediately executed by the processing resource, e.g. in the normal way. In that case, as well as indicating the sequence of any such 'normal' commands prepared in full by the host processor, the command stream layout in an embodiment also indicates some gaps, or 'empty' commands, that are to be populated with the desired command stream data by the processing resource during run-time. Thus, in embodiments, the command stream corresponding to the command stream layout comprises a mixture of commands that have been generated in full by the host processor (e.g. in the normal way) and commands that have been generated by the processing resource (in accordance with the technology described herein).

Various arrangements would be possible in this regard and the techniques of the technology described herein may in general be used to assemble any suitable command streams, as desired, e.g. including any suitable sequence of commands.

The command stream layout provided by the host processor can thus be used by the processing resource to identify the sequence (order) of commands that the assembled command stream should contain. However, the command stream layout that is provided by the host processor may not (yet, at the point at which it is provided to the processing resource) include all of the data required for the full command stream for execution to perform the processing task (e.g. there may be missing state data, parameters, etc., for at least some of the commands in the command stream for which the layout is provided), as the final assembly of the command stream in the technology described herein is performed at least in part by the processing resource itself, during run-time.

There are various ways this command stream assembly by the processing resource can be controlled, as will be explained further below.

The present Applicants have found that this approach, where at least some of the command stream assembly is performed by the processing resource itself, rather than the host processor, can provide an overall more efficient arrangement for the submission of processing tasks for execution to a processing resource of a data processing system.

For instance, in more traditional arrangements, the command stream would be prepared and assembled in full by the host processor (e.g. by a driver for the processing resource) and then provided to the processing resource for execution. This is because the processing resource traditionally does not have enough knowledge of the application to assemble the command streams itself at run-time.

The present Applicants recognise however that attempting to prepare the command streams in full at the host processor, as is done in more traditional arrangements, can introduce significant latency, as well as requiring a higher host processor processing load, and higher bandwidth for transferring data for the command stream to/from the processing resource.

The present Applicants further recognise that such traditional arrangements may therefore be less suitable for applications that require lower latency, which is the case for many modern processing applications, such as graphics processing for gaming or VR/AR applications, where a (near to) real-time display is desired.

More recently, it has also been possible for the host processor to include within a command stream that is to be submitted to the processing resource commands (e.g. so called 'indirect draw' commands) that are able to take their input arguments from a buffer that resides locally to the processing resource, rather than the input arguments being provided by the host processor as part of the command stream. However, in that case, the command stream assembly is still performed by the host processor, it is just that some of the commands, when executed from the command buffer, are able to access local buffers. In contrast, as explained above, the technology described herein provides an improved approach where at least some of the command stream generation work is offloaded to the processing resource itself, such that the final assembly of the full command stream is performed by the processing resource (rather than the command stream being prepared and assembled in full (and in advance) by the host processor and then provided to the processing resource for execution).

The technology described herein thus provides a more efficient approach for assembling command streams for a processing resource of a data processing system, e.g., and in an embodiment, with reduced latency. The technology described herein may therefore be particularly suited for applications where lower latency is desired.

To facilitate this, according to the technology described herein, the host processor generates, as part of the overall command stream (layout) preparation that is performed by the host processor, and provides to the processing resource, suitable indicators of command stream generation work that is to be performed by the processing resource and which indicators will cause the processing resource to perform command stream generation work as required to populate the command stream with (fully) executable commands in a desired format for execution (to cause the processing resource to perform the desired processing operation for the application executing on the host processor). The command steam generation indicators can thus be suitably provided to the processing resource by the host processor, along with the associated command stream layout indicating a sequence of commands for a corresponding command stream, to cause the processing resource to perform the required command stream generation work to assemble the full command stream for execution.

In the technology described herein, the host processor thus provides the processing resource with indicators that command stream generation work is to be performed to cause the processing resource to generate command stream data for populating the command stream. The host processing also provides the processing resource with information (the command stream layout) as to where the resulting command stream data generated by the processing resource should be included in the overall command stream corresponding to the command stream layout.

Thus, in the technology described herein, the information (the command stream layout) that is provided to the processing resource is not (yet) in a desired executable format for performing the data processing task for the application that the command stream is being prepared for. In particular, there may be at least some empty or incomplete commands that need to be populated with command stream data that is generated by the processing resource itself. The command stream generation work that is performed by the processing resource may thus, e.g., and typically does, involve generating command stream data in a desired (e.g. executable) format for inclusion into the command stream to generate an executable command for execution by the processing resource for the desired processing operation for the application that the command stream is being prepared for (so that the processing resource executing the command including the command stream data generated by the processing resource will cause the processing resource to perform the desired processing operation for the host processor's application).

In this way, the overall command stream preparation, including the overall layout and order of the commands within the command stream, is still controlled by the host processor (rather than trying to offload the entire command stream preparation to the processing resource), such that the sequence of commands in the command stream is determined by the host processor, e.g. based on the application's processing requirements (which are not known as such by the processing resource). However, the command stream (layout) that is prepared by the host processor and provided to the processing resource is not a complete command stream (e.g. it is not ready for immediate execution) and at least some of the command stream data in the final, assembled command stream (the command stream that is executed by the processing resource) is generated by the processing resource itself.

The distribution of command stream generation work to the processing resource may be controlled in various ways, as desired, e.g. depending on the application and processing resource in question.

The command stream layout and indicators of command stream generation work may take any suitable form, as desired.

In some embodiments, the indicators may be provided as part of the command stream layout, such that the command stream layout includes the indicators. In that case, the presence of the indicators within the command stream layout indicates that command stream generation work is required, and the positions of the indicators in an embodiment indicate where the resulting command stream data generated by the processing resource should be included into the command stream.

For example, in some embodiments, the command stream layout resembles, and effectively is, a 'normal' command stream (and in an embodiment it also includes at least some normal commands, i.e. that have been prepared by the host processor in the normal way), except that some of the items in the command stream are command "templates" that represent 'empty' or 'incomplete' commands that need to be (and are) populated with command stream data by the processing resource in order to assemble the full commands in the command stream for execution.

Thus, in embodiments, the command stream layout includes at least some commands that have been prepared by the host processor, e.g. in the normal way, and at least some command "templates" representing commands that need to be (and are) populated with command stream data generated by the processing resource. The command stream layout may thus itself comprise a partial command stream that is stored by the processing resource in the command stream buffer for execution, in an embodiment including one or more commands that have been prepared in full by the host processor and one or more command templates representing commands that are to be populated (generated) by the processing resource.

The command "templates" (which will also be referred to herein as command "tokens") can thus be included into the command stream (layout) appropriately, along with any other commands that may have been prepared (in full) by the host processor, with each command template comprising a template for command stream generation work that is to be performed by the processing resource.

Thus, in embodiments, the command "templates" are included into the command stream layout which is provided to the processing resource. The command stream layout can then be (and is) parsed by the processing resource to identify, e.g. by reference to the command "templates", instances of command stream generation work that is to be performed by the processing resource. In that case, the position of a command "template" within the overall sequence of commands indicated by the command stream layout in an embodiment indicates the position at which the resulting command stream data generated by the processing resource (i.e. the fully populated command) should be included in the command stream corresponding to the command stream layout. A corresponding space, e.g. placeholder command, can thus be included in the command stream buffer at the respective position of the command template indicated in the corresponding command stream layout, which can then be (and is) populated with command stream data generated by the processing resource.

Thus, in embodiments, the command templates included within the command stream layout themselves act as respective indicators of command stream generation work, and the method comprises the processing resource parsing the command stream layout to identify instances where command stream generation work is required to be performed.

It would also be possible, and in some embodiments it is the case, that the positions of the command "templates" within the overall sequence of commands indicated by the command stream layout are explicitly indicated to the processing resource, e.g. by providing a separate descriptor of the command stream layout (or at least of the positions of the command "templates" within the command stream layout), that can be read accordingly to identify which commands in the command stream corresponding to the command stream layout require command stream generation work to be performed by the processing resource. In that case, the descriptor of the command stream layout can be included, e.g., at the head of a command stream queue to trigger command stream generation work as required to populate or generate the respective commands for the command stream.

Thus, in embodiments, the one or more indicators of command stream generation work indicate the presence and position of the command templates within the command stream corresponding to the command stream layout. For example, in embodiments, the indicator may comprise a descriptor of the command stream layout that is used to determine where the command stream data generated by the processing resource should be included in the command stream buffer for execution.

Various other arrangements would be possible in this regard.

A command "template" ("token") according to the technology described herein is thus in an embodiment a data structure that includes the necessary information to generate appropriate command stream data for inclusion into the command stream.

A command template may thus, and in an embodiment does, comprise at least some static data (state, parameters, etc.) that is used by the processing resource when performing the command stream generation work. For example, the command template may include suitable descriptors of data (values) or resources (e.g. shader programs) already available to the processing resource, and which may be used by the processing resource when performing the command stream generation work (and re-used when generating different commands).

The command template (token) also includes some empty or incomplete data segments, which need to be populated by the processing resource before the generated command can be executed from the command stream. For example, these may be data segments that are loaded with default (e.g. zero) values, that need to be overwritten with the appropriate data values for the command for inclusion into the command stream.

Thus, a command template (token) relating to a particular command that is to be included into a command stream corresponding to a command stream layout provided by the host processor may, and in an embodiment does, include one or more of: an indication of a type of command stream generation to perform to populate the command (a command stream generation task); a set of descriptors indicating data to be used when performing command stream generation to populate a command; and a set of default or empty values for the command that are to be populated by the processing resource.

Thus, in embodiments, the command stream layout indicates one or more command templates representing commands in the command stream that are to be generated by the processing resource. A command template thus in an embodiment comprises a set of empty data segments that are to be populated with command stream data generated by the processing resource. The command template in an embodiment further comprises a set of descriptors of data and/or resources available to the processing resource that are to be used when generating the command stream data.

The processing resource can then be triggered to perform the required command stream generation work in order to populate the command stream template, to thereby generate a 'full' command (in a desired executable format) for inclusion into the command stream for execution. Once the commands have been generated by the processing resource, and accordingly included into the command buffer, the commands can then be executed from the command buffer, as normal.

The command stream generation (and assembly) work that is to be performed by the processing resource can be triggered in any suitable manner.

In an embodiment, it is triggered when the command stream layout is provided to the processing resource, as the command stream is being stored on the processing resource.

For instance, in some embodiments, the indicators of command stream generation work comprise command stream tokens of the type described above that are included at appropriate positions within the command stream layout.

Thus, in embodiments, the indicators of command stream generation work are provided as part of the command stream (layout), e.g., and in an embodiment, in the form of command "templates", as described above. In that case, the processing resource may be configured to parse the command stream layout provided by the host processor to identify the presence of any such command templates (indicators), and to then perform the required command stream generation work for populating the command template accordingly.

This parsing and identification of the command templates (indicators) within the command stream layout can be done by any suitable element of the processing resource. For instance, the processing resource in an embodiment comprises a command stream processing circuit (command stream frontend) including a supervisor (controller) that is operable to handle the command streams (as will be described further below) and in embodiments it is this supervisor (controller) within the command stream processing circuit (command stream frontend) that identifies the presence of such command templates (indicators), and triggers the command stream generation work accordingly.

That is, in embodiments, the processing resource comprises a command stream processing circuit (command stream frontend) that is operable to schedule processing work to the execution units of the processing resource and wherein the command stream processing circuit includes a controller that is operable to receive the command stream layout and the one or more indicators of command stream generation work provided by the host processor. In that case, in an embodiment, the method comprises (and the processing resource is configured such that), when the controller within the command stream processing circuit identifies an indicator of command stream generation work that is to be performed by the processing resource: the controller triggering the processing resource to perform the command stream generation work to generate the command stream data for inclusion into the command stream corresponding to the provided command stream layout.

The command generation is thus according to embodiments (directly) triggered by the controller within the command stream processing circuit based on the controller identifying the indicators of command stream generation work, without having to execute a command from the command buffer that has been submitted by the host processor. In this way, the triggering of the command stream generation work is in embodiments performed independently of the execution of commands from the command buffer (e.g. rather than having the command stream generating work being triggered by executing a command to perform such work), without the host processor having to assemble command buffers in advance to achieve this. This then means that the command stream assembly can be performed separately to the command execution, and thus in embodiments relatively earlier, to further reduce latency. This also then saves having to set up command buffers that are dedicated to performing command stream generation work, for example. This can significantly reduce burden on the host processor since the host processor does not need to perform all of the command stream generation and assembly itself, but instead it can simply provide reduced information to the processing resource to trigger the processing resource to perform its own command stream assembly.

For instance, in embodiments, the command stream processing circuit (command stream frontend) (e.g. the supervisor (controller) within the command stream processing circuit (command stream frontend)) is configured to execute a command stream assembly program that parses the command stream (layout) and indicators to determine the command stream generation work to be performed. The command stream generation work is then performed accordingly (either by the supervisor (controller), or another processing circuit within the processing resource, which may either be the shader core, or may be a dedicated command stream assembly circuit that is provided for this purpose, as will be explained further below), with the resulting command stream data then being written to the appropriate position in the command stream in the command stream buffer. That is, in embodiments, the command stream processing circuit (command stream frontend) of the processing resource is configured to (and does) execute a command stream assembly program that is operable to determine command stream generation work that needs to be performed by the processing resource and to then assemble executable commands accordingly for inclusion into a command buffer. The command buffer that has been assembled in this way can then be stored appropriately and the respective commands then executed from the command buffer in the normal manner, e.g. as if the command buffer had been submitted by the host processor.

Thus, in embodiments, an indicator of command stream generation work according to the technology described herein comprises a command "template" ("token") that is included within the command stream (layout) and which includes a set of one or more 'empty' or default data segments that are to be populated by the processing resource. In such embodiments, the processing resource (the supervisor (controller)) is in an embodiment operable to identify any indicators of command stream generation work from within the command stream (layout) and then trigger the command stream generation work accordingly.

However, other arrangements would be possible. For instance, in some embodiments, the indicators of command stream generation work could be provided separately and in addition to the command stream layout, e.g. as separate side channel information, e.g., and in an embodiment, directly to an appropriate processing circuit of the processing resource. For example, in that case, an indicator may be provided by the host processor directly to the processing element (e.g. the supervisor (controller)) that controls the command stream generation work. In that case, the processing resource to which the indicators are provided may then perform the indicated command stream generation work and include the resulting command stream data into the appropriate position in the command stream corresponding to the command stream layout for which the command stream generation work is being performed.

Thus, in some embodiments, in addition to providing a command stream layout, in an embodiment including command templates that identify the positions in the command stream where command stream data generated by the processing resource should be included, the host processor also provides separate and additional indicators of command stream generation work to the processing resource that trigger the processing resource to perform the indicated command stream generation work to populate the command templates within the command stream (rather than the processing resource parsing the command stream layout to identify instances where command stream generation work is required). Again, in this way, the command generation (command stream assembly) performed by the processing resource is independent of the execution of commands from the command buffer, and can thus be (and is) performed relatively earlier, e.g. within the command stream frontend.

In that case, suitable command templates are in an embodiment still included in the command stream layout to act as a placeholder to identify where the command stream data generated by the command stream generation work performed by the processing resource should be included, but with an indicator that command stream generation work is required being provided to the processing resource additionally and separately to the command template. For example, in this case, the indicator may comprise a descriptor of the command stream layout, with the indicator indicating which of the commands in the command stream corresponding to the command stream layout require command stream generation work to be performed by the processing resource (and the processing resource then being triggered to perform the command stream generation work as required, e.g., and in an embodiment, by using the command templates included in the command stream layout to determine the type of command stream generation work to be performed). The resulting command stream data can then be included at the appropriate position within the command stream corresponding to the command stream layout, e.g. as indicated by the command stream layout. Alternatively, a separate indicator may be provided that itself comprises all of the information necessary to build a command.

Various other arrangements would of course be possible.

The type of command stream generation work that is performed by the processing resource can be any suitable and desired type of command stream generation work.

In some embodiments, the processing resource is operable to perform a number of pre-set command stream generation tasks. For example, the processing resource may be configured to perform certain types of command stream generation tasks, e.g. that are most commonly encountered, and which can therefore be efficiently performed by the processing resource itself.

In that case, whenever an indicator of command stream generation work is provided to the processing resource, the processing resource may be caused to always perform the (same) pre-set command stream generation task or tasks accordingly.

In an embodiment, however, there is additional control as to which command stream generation tasks are to be performed in response to an indicator. For example, where the processing resource is configured to be able to perform a plurality of pre-set command stream generation tasks, the indicator may further indicate a subset of one or more command stream generation tasks that are to be performed in response to the indicator.

For instance, in some embodiments, as mentioned above, the indicator may comprise a command template (token) that includes suitable descriptors of the type of command stream generation work that is to be performed. Thus, the command template may include one or more data fields that indicate certain types of command stream generation work, e.g. certain pre-set tasks, that should be performed in order to populate the command template. The command template may indicate this in any suitable fashion, as desired.

Thus, in embodiments, the processing resource is configured to perform a set of one or more pre-set command stream generation tasks to generate command stream data, and wherein in response to the indicator, the processing resource is configured to perform one or more of the pre-set command stream generation tasks. In an embodiment, the indicator indicates a subset of one or more of the pre-set command stream generation tasks to be performed in response to the indicator.

The processing resource can then perform the indicated tasks in order to generate the requisite command stream data for inclusion into the command stream.

Other arrangements would however be possible. For instance, in some embodiments, the indicator may comprise a bitwise mask, with the bit positions in the mask being set accordingly to indicate the type(s) of (e.g. pre-set) command stream generation work that is to be performed.

Thus, the indicators may (and in an embodiment do) indicate a type of command stream generation work that is to be performed by the processing resource.

As mentioned above, the indicator (e.g. command template) in an embodiment also includes descriptors of any other resources (e.g. data or attributes) that may be needed to perform the command stream generation work. For instance, it is often the case that a given command within a command stream to perform a data processing task may re-use data or resources that are already available to the processing resource, e.g. because it has been generated previously by the processing resource, or is pre-set for the processing resource.

This may particularly be the case for graphics processing, where it is often the case that there will be intermediate data generated during the graphics processing that is then used for subsequent graphics processing steps, but which is then discarded once the graphics processing is complete.

For instance, in an example, the indicator (command template) may relate to a command for a geometry processing task within an overall graphics processing operation. In that case, the geometry processing task may require vertex attributes. The command stream generation work performed by the processing resource (e.g. graphics processor in this case) may thus involve obtaining the vertex attributes (with the indicator in an embodiment including an appropriate descriptor of the required vertex attributes). The obtained vertex attributes can then be processed accordingly (e.g. by executing an appropriate (pre-set) geometry command generation program on the processing resource) to generate suitable command stream data (a command) for inclusion into the command stream.

Similarly, in another example, the indicator (command template) may relate to a command for a fragment processing task within an overall graphics processing operation, e.g., a fragment shading command. In that case, the fragment processing task may require texture data. The command stream generation work performed by the processing resource may thus involve obtaining the required texture data and then processing this accordingly (e.g. by executing an appropriate (pre-set) fragment command generating program) to generate suitable command stream data (a command) for inclusion into the command stream.

Another example might be where the indicator (command template) causes the processing resource to re-use a shader program, or shader resource, that is available at the processing resource in order to generate the command stream data. Again, this can be indicated by including an appropriate descriptor within the indicator (command template) of the shader program/resource to be used.

Various other arrangements would be possible in this respect.

Thus, in embodiments, the command stream generation work that is performed by the processing resource is command stream generation work that re-uses data and/or resources that are already available to the processing resource.

Indeed, a benefit of this command template approach is that because the final command stream assembly is performed by the processing resource itself, the processing resource is able to re-use existing resources (e.g. data, programs) to populate different commands when performing its command stream generation work. The approach of the technology described herein can thus provide further efficiencies, e.g., further reductions in latency, e.g. compared to traditional approaches where the command streams are prepared in full at the host processor, such that any information only available at the processing resource would have to be transferred back to the host processor in order to generate the commands.

As mentioned above, the host processor also needs to provide the processing resource with information as to where the command stream data that is generated by the processing resource should be written into the overall command stream (buffer) (the overall command stream layout). Thus, the indicators may (and in an embodiment do) also indicate a position within the overall command stream that the result of the command stream generation work should be included.

In some embodiments this is done implicitly by including suitable data structures (e.g. command templates (tokens)) within the command stream layout, as discussed above, with the position of the data structures (command templates (tokens)) within the command stream layout acting as indicators that indicate where the resulting command stream data should be included.

Other arrangements would however be possible. For example, rather than simply using the positions of the command "templates" within the overall command stream layout corresponding to the command stream to determine where the resulting command stream data should be included in the command stream, a separate and additional descriptor of the command stream layout may be provided to the processing resource which is used for this purpose. In that case, the command stream corresponding to the command stream layout provided to the processing resource in an embodiment still includes command templates, but these now serve as placeholders (e.g. empty memory addresses) in the command stream for the command stream data to be written to, and a separate descriptor of the command stream layout is provided to the processing resource indicating where the command stream data generated by the processing resource should be included (e.g. by indicating which of the commands in the command stream corresponding to the command stream layout comprise command "templates" that need to be populated by the processing resource).

It would also be possible for the indicators themselves to explicitly indicate where the resulting command stream data should be included into the command stream, e.g. by reference to another command in the sequence of commands for the command stream. Various arrangements would be possible in that regard.

As mentioned above, in the technology described herein, indicators of command stream generation work are generated by the host processor and provided accordingly to the processing resource to cause the processing resource to perform command stream generation work.

The actual command stream generation work itself can be performed by the processing resource in any suitable fashion.

For example, this may be performed by a dedicated (e.g. hardware) circuit that is provided for this purpose, or could be another processing circuit (processor) that is re-purposed for command stream generation work, as desired. In an embodiment, the command stream generation work is performed under the control of a supervisor (controller) that manages the command stream operation, as mentioned above. Thus, in embodiments, the command stream generation work may be performed by the supervisor (controller), or by the supervisor (controller) triggering another processing circuit (processor) within the processing resource to perform the command stream generation work.

In that case, the processing circuit (processor) that performs the command stream generation work may be any suitable processing circuit (processor). Thus, this could be a dedicated (e.g. hardware) circuit that is provided for this purpose, or could be another processing circuit (processor) that is re-purposed for command stream generation work, as desired.

In the case of a graphics processor, for example, the command stream generation work could be performed by executing an appropriate compute shader program. For instance, where the processing resource is a graphics processor, the processing resource may (and in an embodiment does) comprise a programmable execution unit (a shader core) that is operable to execute shader programs. In response to an indicator that command stream generation work is to be performed, the command stream supervisor (controller) may thus be configured to cause the programmable execution unit to execute an appropriate shader program to perform the command stream generation work.

Various other arrangements would be possible in this regard.

According to the technology described herein, therefore, the host processor is arranged to generate a command stream layout indicating a sequence of commands for a command stream, which is then provided to the processing resource accordingly.

At the same time, the host processor also generates one or more indicators of command stream generation work that are also provided to the processing resource (either within the command stream layout, or separately) and that cause (trigger) the processing resource to perform command stream generation work to generate command stream data to populate the command stream corresponding to the command stream layout for execution. That is, the command stream layout that is provided to the processing resource is not yet complete, and at least some of the final assembly of the command stream for execution is performed by the processing resource itself.

This can therefore provide an overall improved, e.g. more efficient (lower latency), arrangement for the submission of processing tasks for execution to a processing resource.

Furthermore, the operation and command stream preparation and processing task execution in the manner of the technology described herein can be achieved without the need for significant main (host) processor overhead, and without, for example, requiring significantly more sophisticated driver operation for the processing resource.

The technology described herein may therefore provide various benefits compared to other approaches.

The commands (instructions) within the (fully assembled) command stream can then be (and are) executed from within the command stream buffer to cause the processing resource to perform data processing tasks, e.g. in the normal manner. That is, once the command stream has been suitably assembled for execution in the manner described above, the command stream can then be executed, e.g. as normal.

The technology described herein also extends to the operation of preparing the command streams per se, and, correspondingly, to the processing resource executing the command streams per se.

Thus, a further embodiment of the technology described herein comprises a method of operating a host processor of a data processing system that comprises a host processor operable to execute applications of the data processing system, and a processing resource operable to perform processing tasks for applications executing on the host processor;

the method comprising:
preparing on the host processor, in response to a request for data processing to be performed by the processing resource from an application executing on the host processor, a command stream layout, the command stream layout indicating a sequence of commands for a command stream for execution by the processing resource to cause the processing resource to perform processing tasks for the application;
wherein preparing the command stream layout further comprises:
the host processor generating one or more indicators of command stream generation work that is to be performed by the processing resource to populate the command stream corresponding to the command stream layout for execution, which indicators will trigger the processing resource to perform command stream generation work to generate command stream data for inclusion into the command stream corresponding to the command stream layout;
the method further comprising:
the host processor providing the command stream layout and the one or more indicators of command stream generation work to the processing resource.

A further embodiment of the technology described herein comprises a host processor for a data processing system, the host processor operable to execute applications of the data processing system, and comprising:
command stream generating circuit that is configured to prepare, in response to a request for data processing to be performed by the processing resource from an application executing on the host processor, a command stream layout, the command stream layout indicating a sequence of commands for a command stream for execution by the processing resource to cause the processing resource to perform processing tasks for the application;
wherein preparing the command stream layout further comprises:
the host processor generating one or more indicators of command stream generation work that is to be performed by the processing resource to populate the command stream corresponding to the command stream layout for execution, which indicators will trigger the processing resource to perform command stream generation work to generate command stream data for inclusion into the command stream corresponding to the command stream layout;
the host processor further comprising a processing circuit configured to provide the command stream layout and the one or more indicators of command stream generation work to the processing resource.

A further embodiment of the technology described herein comprises a method of operating a processing resource of a data processing system, the processing resource being operable to perform processing tasks for applications executing on a host processor of the data processing system;
the method comprising:
the processing resource receiving, from a host processor of the data processing system, a command stream layout, the command stream layout indicating a sequence of commands for a command stream for execution by the processing resource to cause the processing resource to perform processing tasks for the application;
the processing resource also receiving from the host processor one or more indicators of command stream generation work that is to be performed by the processing resource to populate the command stream corresponding to the command stream layout;
the processing resource storing a command stream corresponding to the command stream layout in a command stream buffer for execution; and
the processing resource executing commands in the command stream from within the command stream buffer to perform processing tasks for the application;
wherein the processing resource storing a command stream corresponding to the command stream layout in the command stream buffer comprises:
in response to an indicator of command stream generation work to be performed by the processing resource for the command stream corresponding to the command stream layout:
the processing resource performing the indicated command stream generation work to generate command stream data for inclusion into the command stream; and
writing the generated command stream data into the command stream in the command stream buffer for execution by the processing resource.

A further embodiment of the technology described herein comprises a processing resource for a data processing system, the processing resource operable to perform processing tasks for applications executing on a host processor of the data processing system, and comprising:
a command stream buffer for storing a command stream corresponding to a command stream layout received from the host processor for execution;
a processing circuit configured to, in response to an indicator provided by the host processor of command stream generation work to be performed by the processing resource to populate a command stream corresponding to a command stream layout:

i. perform the indicated command stream generation work to generate command stream data for inclusion into the command stream corresponding to the command stream layout; and ii. write the generated command stream data into the command stream in the command stream buffer for execution by the processing resource; and a command stream execution circuit that is configured to execute commands in the command stream from within the command stream buffer to perform processing tasks for the application.

The technology described herein according to these further embodiments may have any and all of the features described above in relation to the first and second embodiments, at least to the extent they are not mutually exclusive. That is, the host processor and processing resource according to these further embodiments may have any features described in relation to the host processor and processing resource of the earlier embodiments, and may be operated in the same fashion.

The processing resource can be any suitable processing resource that is operable to perform processing tasks for applications.

In an embodiment, the processing resource is a graphics processor (a graphics processing unit (GPU)). Thus, in embodiments, the processing resource (graphics processor) is operable to perform graphics processing tasks for applications executing on the host processor (and is additionally configured to perform command stream generation work in the manner described above). In that case, the command stream generation work in an embodiment generates executable commands for storing in the command stream buffer that when executed by the graphics processor will cause the graphics processor to perform a graphics processing task.

The technology described herein is particularly suited for graphics processing applications as these often desire lower latencies. For example, this is particularly the case for real-time rendering for gaming and VR/AR applications.

However, the technology described herein can equally be applied to other suitable data processing systems where a host processor prepares command streams for a processing resource and where lower latencies are desired.

The processing that is to be performed by the processing resource can be any suitable and desired processing that the processing resource in question can perform. This may, and in an embodiment does, accordingly depend upon the nature of the processing resource.

In the case of a graphics processor, the processing to be performed in an embodiment comprises appropriate graphics processing, such as generating graphics processing outputs, such as rendering frame (images) for display and/or for other purposes (e.g. render to texture operations).

The data processing tasks that are to be performed by the processing resource for the application can be any suitable and desired processing tasks that the processing resource in question can perform. They may, and in an embodiment do, accordingly depend upon the nature of the processing resource, and on the particular processing that is to be performed by the processing resource.

In the case of a graphics processor, the processing tasks in an embodiment comprise appropriate graphics processing operations, such as for generating graphics processing outputs, such as rendering frames (images) for display and/or for other purposes (e.g. render to texture operations).

Any desired number of command streams (or command stream layouts) can be prepared for the processing resource. In some embodiments a plurality of (e.g. two) command streams are executed by the processing resource, with a corresponding plurality of command stream layouts thus being prepared by the host processor, but in other embodiments there may only be a single command stream. The or each command stream may relate to any suitable and desired processing tasks.

The or each command stream should, and in an embodiment does, include one or more, and in an embodiment plural, commands (instructions). The or each command stream can include any suitable and desired commands (instructions) to cause the processing resource to perform the desired processing tasks, e.g., and in an embodiment, in accordance with the command stream operation of the data processing system and processing resource in question. Thus the command stream in an embodiment can, and in an embodiment does, include one or more or all of:

commands (instructions) to set parameters for processing tasks, commands (instructions) to execute the processing tasks, commands (instructions) to wait for the completion of a processing task, etc.

Where there are a plurality of (e.g. two) commands streams, the command streams can also include wait commands that cause the execution of one command stream to wait pending the execution of the (or an) other command stream. An example of this mechanism is described in U.S. Pat. No. 10,861,125 (Arm Limited), the contents of which are incorporated herein entirely, and which may be applied also to the command streams of the technology described herein.

The host processor can prepare the command stream (layout) for the processing resource in response to a request for processing to be performed by the processing resource from an application in any suitable and desired manner. In an embodiment the host processor adds respective commands, or command "templates" as described above, to a respective command stream (layout) to cause the processing resource to perform the desired processing tasks. The host processor should add commands to a given command stream appropriately, e.g., in dependence upon the processing tasks required, as discussed above. For example, where there are plural command streams, the processor may add commands for a particular type or types of processing task to one command stream, and commands for a different type or types of processing task to another command stream.

For example, in the case of a graphics processor, in an embodiment, the host processor will prepare one command stream (layout) that includes a sequence of commands to cause the graphics processor to perform geometry tasks (jobs), and another command stream (layout) including a sequence of commands to cause the graphics processor to perform compute tasks (compute jobs), in an embodiment compute jobs that are to perform tessellation operations.

In an embodiment, the host processor is operable, as it is preparing the command streams, to, for a (and for each) command stream that is being prepared, track the current position that has been reached in the command stream (i.e. the latest command added to the command stream). This is in an embodiment done by maintaining a progress counter that tracks how many commands (or at least commands of a particular type or types) have been included in the command stream. Thus the host processor in an embodiment increments a progress counter as it adds, e.g. particular, commands to a command stream (and in an embodiment does this for each command stream that it is preparing).

Thus, in an embodiment, the host processor will progressively add commands, or command "templates", etc., to a (and to each) command stream (layout) for causing the processing resource to perform desired processing tasks for an application, and while doing so, for each command stream (layout), keep track of the current position in the command stream that has been reached (in an embodiment by maintaining a progress counter value for the command stream).

Thus when an appropriate command (template) is added to a command stream layout, the host processor will also appropriately increment a progress counter value for the command stream corresponding to the command stream layout, so as to keep track of the current position that has been reached in that command stream.

The preparation of the command streams (or command stream layouts) by the host processor can be performed by any suitable and desired element and component of the host processor. In an embodiment, a driver for the processing resource in question prepares the command streams (and accordingly operates in the manner of the technology described herein). Thus in an embodiment, the command stream generating circuit comprises a programmable processing circuit that can be programmed (e.g. and in an embodiment to operate as a driver for the processing resource) to prepare the command streams in the desired manner.

The indicators (e.g. command "templates") can be generated at the same time, in an embodiment by the same element of the host processor, e.g., and in an embodiment, the same command stream generating circuit operating as a driver for the processing resource.

Thus, a further embodiment of the technology described herein comprises a driver for a processing resource of a data processing system that is operable to perform processing tasks for applications executing on a host processor of the data processing system, the driver being operable to:
  prepare, in response to a request for data processing to be performed by the processing resource from an application executing on the host processor, a command stream layout, the command stream layout indicating a sequence of commands for a command stream for execution by the processing resource to cause the processing resource to perform processing tasks for the application;
  wherein preparing the command stream layout further comprises:
  generating one or more indicators of command stream generation work that is to be performed by the processing resource to populate the command stream corresponding to the command stream layout for execution, which indicators will trigger the processing resource to perform command stream generation work to generate command stream data for inclusion into the command stream corresponding to the command stream layout.

Once the command stream (layout) has been prepared by the host processor, the command stream is provided to the processing resource, e.g. graphics processor, for execution, and the processing resource, e.g. graphics processor, will then execute the command stream appropriately.

The command stream layout can be provided to the processing resource, e.g. graphics processor, in any suitable and desired manner.

The command stream layout, once provided to the processing resource, is then used to build a command stream. The resulting command stream is initially stored by the processing resource in appropriate command stream storage, in the form of a 'command stream buffer', from where the commands can be read appropriately by the processing resource for execution. The command stream buffer may take any suitable form, as desired. In embodiments it comprises a ring buffer.

As described above, as part of the initial building and storing of the command stream, the processing resource is in an embodiment triggered to perform the required command stream generation work to populate the command stream for execution.

It will be appreciated in this respect that the processing resource may start executing commands in the command stream before the command stream is fully populated. That is, the steps of the command stream generation work performed by the host processor to populate the command stream may be, and in an embodiment are, performed in parallel with the execution of the command stream.

The execution of the command stream by the processing resource can be configured and implemented in any suitable and desired manner. For example, the processing resource may include an appropriate supervising controller, such as a microcontroller (MCU), that is operable to handle the scheduling of the command streams on the hardware execution resources of the processing resource (and in an embodiment, this is the case). Other arrangements would, of course, be possible.

Correspondingly, in an embodiment, hardware execution resources of the processing resource include one or more, and in an embodiment a plurality of, command stream execution units operable to execute (and that execute) commands in a command stream so as to perform processing tasks for an application.

The processing resource, e.g. graphics processor, can correspondingly execute the command stream in any suitable and desired manner. For example, the execution of plural command streams (where provided) is in an embodiment started simultaneously, with the processing resource, e.g. graphics processor, then processing the commands in each command stream appropriately in turn (and in parallel where the processing resource has the capability to do that and that is appropriate) (and in accordance with and on the basis of any wait commands that are included in a command stream).

Thus, in an embodiment, the processing resource will execute commands in the command streams in turn (and in order), and as it does so will, for a (and for each) command stream that it is executing, track its progress through (along) the command stream (the position that it has currently reached in the command stream), for example, and in an embodiment, by maintaining a progress count for the command stream that is (in an embodiment) automatically incremented when command stream commands that are to increment the progress counter are executed. The current command stream position (progress count) could, e.g., be maintained in an appropriate register of or accessible to the processing resource.

The technology described herein can be used for all forms of output that a processing resource of a data processing system may be used to generate. For example, in the case of graphics processing, the graphics processor may generate frames for display, render-to-texture outputs, etc. The graphics processor may however also be used for general purpose graphics processing. The output data values from the processing are in an embodiment exported to external, e.g. main, memory, for storage and use, such as, in the case of graphics processing, to a frame buffer for a display.

In some embodiments, the data processing system comprises, and/or is in communication with, one or more memories and/or memory devices that store the data described herein, and/or store software for performing the processes described herein. The data processing system may also comprise or be in communication with a display for displaying images based on the data generated by the data processing system.

The technology described herein is applicable to any suitable form or configuration of processor or data processing system. In an embodiment, the various functions of the technology described herein are carried out on a single data processing platform that generates and outputs data.

However, the technology described herein may also find utility in cloud-based systems, for example where the host processor resides in the cloud and controls a local processing resource (e.g. a local display), and where latency may also be an issue. For example, the technology described herein can be used for cloud-client rendering, in which case the rendering commands can be assembled at run-time either on the client side, or on the cloud side, depending where the rendering resources are located.

Various arrangements would be possible in this regard.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and circuits/circuitry of the technology described herein may comprise a suitable processor or processors, controller or controllers, functional units, circuits/circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Subject to any hardware necessary to carry out the specific functions discussed above, the data processing system can otherwise include any one or more or all of the usual functional units, etc., that data processing systems include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that the techniques for submitting processing tasks to a processing resource described herein can be used in non-graphics contexts as well.

FIG. 1 shows an exemplary graphics processing system. An application 2, such as a game, executing on a host processor 1 will require graphics processing operations to be performed by an associated graphics processing unit (graphics processor) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

In the present embodiments, the appropriate commands and data for performing the processing tasks required by the application 2 are provided to the graphics processor 3 in the form of one or more command streams, that each include sequences of commands (instructions) to cause the graphics processor to perform desired processing tasks.

The overall preparation of the command streams is performed by the driver 4 on the host processor 1 and the command streams may, for example, be stored in appropriate command stream buffers, from where they can then be read by the graphics processor 3 for execution. Each command stream will contain commands (instructions) to set parameters for graphics processor tasks, as well as commands (instructions) to execute a task, etc.

Figure 2:
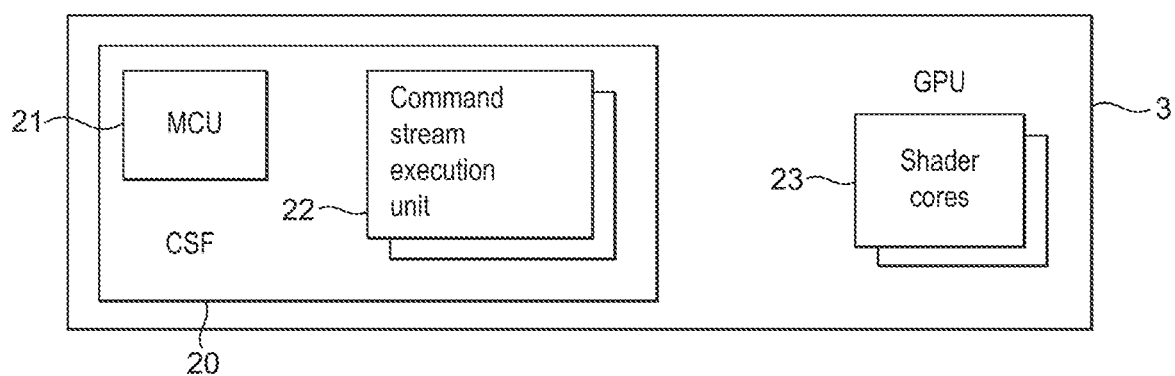
FIG. 2 shows schematically a graphics processor that can be operated in the manner of the technology described herein.

In order to facilitate this operation, the graphics processor 3 includes, as shown in FIG. 2, a command stream frontend 20 that includes a command stream supervisor (controller) 21 (in the form of a microcontroller) that is operable to schedule and issue commands from the command streams to respective command stream execution units 22. The command stream execution units 22 then execute the commands in the respective command streams to trigger the processing execution units 23 of the graphics processor (which in the present example are shown as being a plurality of shader cores, although other arrangements would, of course, be possible) to perform the desired processing tasks.

Figure 3:
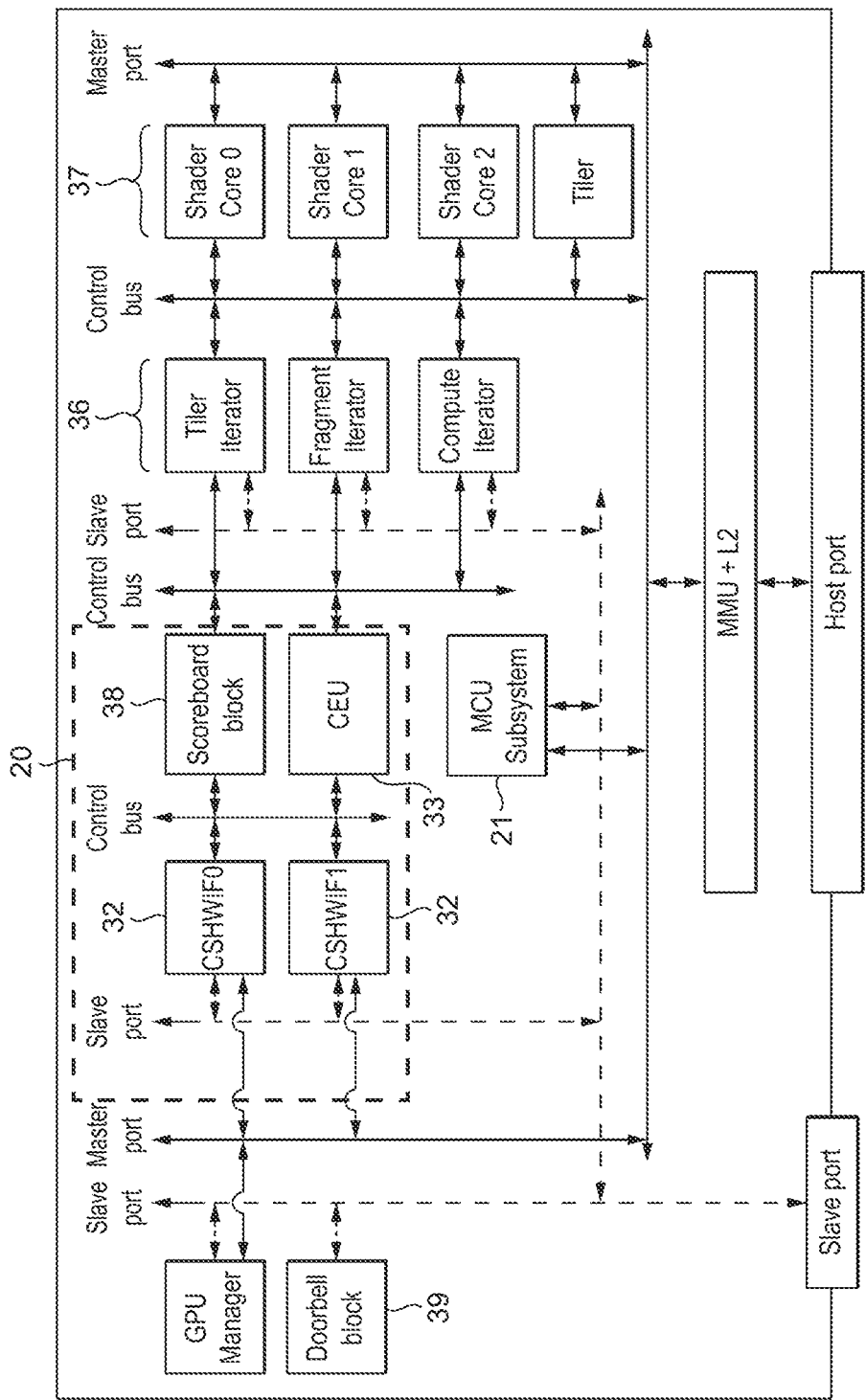
FIG. 3 shows schematically in more detail a graphics processor including a command stream frontend.

FIG. 3 shows in more detail the graphics processor 3 including the command stream frontend 20. The supervisor (controller) 21 (in the form of a microcontroller) handles communications with the host processor 1, and schedules the processing of active command streams on the command stream frontend 20.

The command stream frontend 20, which may be implemented as a single (hardware) functional unit, generally comprises one or more command stream interfaces 32 and a (shared) command stream execution unit 33. Each command stream interface 32 has an associated command buffer containing a set of active instructions to be processed, as well as a registry and local memory for storing the internal state (parameters) for the processing. The command buffer is contained in system memory with the command stream interface containing its properties so it can obtain commands from it.

The instructions within the command buffer(s) are provided to the command stream execution unit 33 and then executed in turn (e.g. in a round robin fashion where multiple command stream interfaces 32 are provided). The command stream execution unit 33 thus executes the commands in turn, with the instructions either being emulated in software by the supervisor (controller) 21, or assigned to the accelerator hardware, e.g. depending on the type of instruction.

(In general when the command stream execution unit 33 executes an instruction, it will either perform the operation synchronously itself (e.g. a move operation), or it will "package up" a request and send it to the GPU hardware units in the case of (e.g. a run command), or it will inform the supervisor (controller) 21, which may then emulate the command in software.)

The command stream frontend 20 also includes a scoreboard block 38 that is able to independently track the processing job completion for each of the command steam interfaces 32. The scoreboard block 38 is thus a shared resource. The scoreboard block 38 tracks the progress of the processing tasks associated with each processing job and reports this back.

As shown in FIG. 3, the graphics processor 3 includes a number of hardware units, such as a plurality of iterators 36 (here, separate tiler, fragment and compute iterators are provided, although other arrangements would of course be possible) and processing (e.g. shader) cores 37.

A processing job specified in a command being executed by the command stream execution unit 33 can thus be assigned and sent to a respective iterator 36, along with the current parameters held within the registry and local memory. The iterator 36 acts to break down the processing job into a set of processing tasks which can then be distributed between the processing cores 37 for processing.

The host processor 1 communicates with the supervisor (controller) 21 of the graphics processor 3 via a shared interface memory (which may be main memory, or another suitable memory cache, depending on the configuration). Thus, when an application 2 running on the host processor 1 makes a call for processing by the graphics processor 3, the host processor 1 can communicate with the supervisor (controller) 21 of the graphics processor 3 via the shared memory, and the supervisor (controller) 21 can then read the data in from the shared memory. For instance, the host processor 1 can write to a doorbell block 39 to interrupt the current operation of the supervisor (controller) 21 and cause the supervisor (controller) 21 to handle new work.

Once the supervisor (controller) 21 receives a request from the host processor 1 to execute a command stream, the supervisor (controller) 21 can then assign a respective command stream interface 32 for the command stream, and the command stream can then be loaded into a command buffer for the assigned interface (and the command stream properties written to the assigned interface). The commands are then passed in order from the command buffer to the command stream execution unit 33 which interprets the commands from the command buffers, and executes the commands using the local memory and registry information associated with that command stream interface and buffer.

When a command is executed by the command stream execution unit 33, depending on the type of instruction, the instruction may then be performed either in hardware (e.g. by the command stream execution unit 33 itself, or using the iterators 36 and shader cores 37), or may be emulated by the supervisor (controller) 21. For instance, any commands e.g. for updating the local memory and registry information may typically be implemented by the command stream execution unit 33 itself in order to set the parameters for a processing job. The processing job may then be sent to the GPU hardware unit(s) for processing, along with these parameters.

The above description describes the execution of command streams by the graphics processor 3.

In more conventional graphics processing systems, the command streams are prepared in full by the host processor 1 and then provided to the graphics processor 3 for execution.

Thus, in more conventional systems, the driver 4 on the host processor 1 side builds the full command stream and submits the assembled command stream to the command stream frontend 20 on the graphics processor 3 side for execution. The traditional approach needs to prebuild all the command streams on the host processor side 1, as there is no support for the graphics processor 3 to perform any of the command stream assembly itself.

The present Applicants have however recognised that the traditional approach based on the host processor 1 generating and assembling the command streams for the graphics processor 3 can introduce significant rendering latency, as well as increased processing load at the host processor 1, increased host processor-graphics processor traffic, and higher memory bandwidth.

To address this, the technology described herein provides a novel approach where the command streams are at least partly assembled by the processing resource (e.g. the graphics processor 3) itself, during run-time. This can therefore reduce latency and provide an overall more efficient command stream generation. There are various ways this can be done in embodiments, e.g. as will be explained below.

Figure 4:
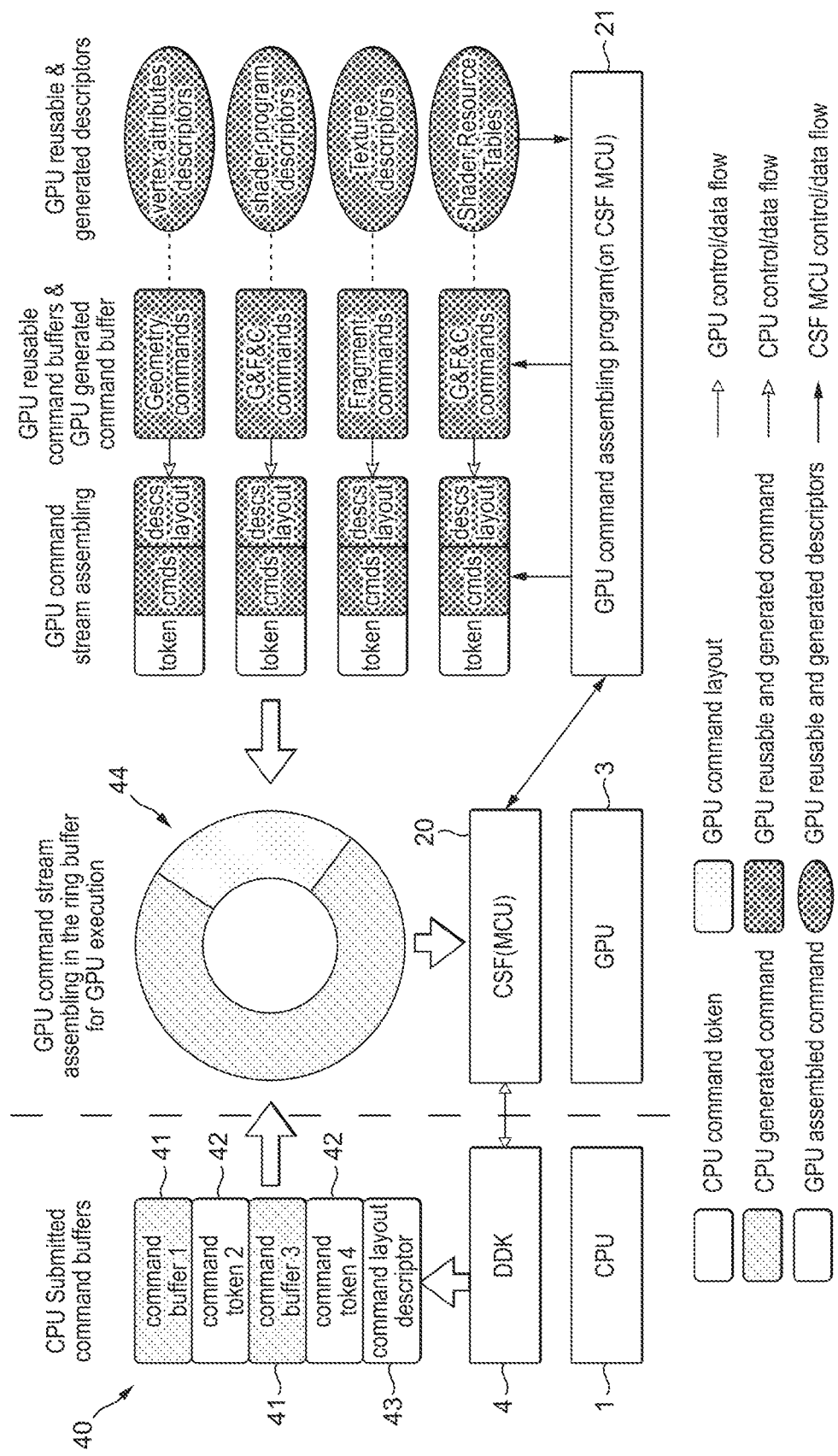
FIG. 4 shows schematically a "token" and "layout" based approach to command stream generation an embodiment.

FIG. 4 shows schematically a graphics processing system architecture using a "token" and "layout" based graphics processor approach to command stream assembly a first embodiment.

In this embodiment, the driver 4 on the host processor 1 side prepares according to the application's requirements a command stream layout 40 that indicates a sequence of commands 41, 42 for a command stream for the graphics processor 3. As shown in FIG. 4, the command stream layout 40 indicates both normal commands 41 (that have been prepared in full by the host processor 1, e.g. in the normal way) and also a set of command "tokens" 42.

These command "tokens" are effectively templates for commands for which the command stream generation is to be performed by the graphics processor 3. The command "tokens" include all of the information necessary to assemble a full command for execution (but are not themselves executable command as they are 'empty' and need to be populated with command stream data that in the present embodiment is generated by the graphics processor 3 during run-time). These command tokens 42 are therefore in an embodiment included into the overall command stream layout 40 that is submitted by the driver 4 to the graphics processor 3.

An example of a command token 42 an embodiment may thus be structured as follows.

The command stream layout 40 indicating the sequence of commands 41 (and command tokens 42) for the command stream is then submitted to the graphics processor 3 and a command stream corresponding to the command steam layout 40 is then stored in an appropriate command stream buffer 44 (which in FIG. 4 is illustrated as a ring buffer but other arrangements would be possible) for execution by the graphics processor 3. The command stream execution unit 33 of the graphic processor 3 can then execute the commands from within the command stream buffer 44, e.g. in the normal way for command stream execution.

However, the command stream layout 40 also indicates some command "tokens", as mentioned above, which are not yet full commands (i.e. are not yet in a desired executable format for causing the graphics processor 3 to perform the required processing task for the application 2 executing on the host processor 1), and need to be populated with command stream data generated by the graphics processor 3. Thus, in the present embodiment, as part of the storing of the command stream corresponding to the command steam layout 40 is then stored in the command stream buffer 44, the graphics processor 3 is triggered to perform appropriate command stream generation work to generate command stream data for inclusion into the command stream, in particular to populate the command tokens 42.

In the present embodiment this command stream generation work is controlled by the command stream frontend 20 of the graphics processor 3 which is operable to identify the presence of such command tokens 42 and then trigger the required command stream generation work accordingly. For example, as shown in FIG. 4, the command stream supervisor (controller) 21 of the graphics processor 3 may be caused to execute a command stream assembly program that is operable to identify the command stream generation work that needs to be performed in order to populate the command tokens, and then generate appropriate command stream data for inclusion into the command stream in the command stream ring buffer 44, at the appropriate positions, e.g. as indicated by the command stream layout 40 (which positions may, e.g., be indicated to the command stream supervisor (controller) 21 by providing the command layout descriptor 43 to the command stream supervisor (controller) 21).

```
Struct command_buffer_token
{
    Enum command_buffer_type;           //command buffer types: graphics, compute, transport, or more types defined.
    { n`command_constant_parameters };      // Multiple default generic constant parameters the command buffer used, init on CPU
    { n`command_Stateless_data };           // Multiple specific stateless data for the specific command buffer used, init on CPU
    { descriptor_layout );              // descriptor layout represent descriptors binding slots, init on CPU
    Descriptor_set[SIZE];               // preserved "size" number of descriptors array for the command buffer used, populated on GPU
    Command buffer[LENGTH];             // preserved "length" size of linear command buffer memory for the command list, populated on GPU
}
```

Thus, in this example, the command token 42 includes a number of data fields that respectively indicate the command type; generic constant parameters the command should use; stateless data; a descriptor layout identifying graphics processor 3 resources to be used when populating the command; a descriptor set that is to be populated by the graphics processor 3 and a command buffer length indicating how much space in the command buffer 44 should be allocated for the resulting command.

Other arrangements would of course be possible.

As shown in FIG. 4, in this example, a command layout descriptor 43 is also generated that defines the sequence of commands for the full command stream that the command stream layout 40 corresponds to.

Figure 5:
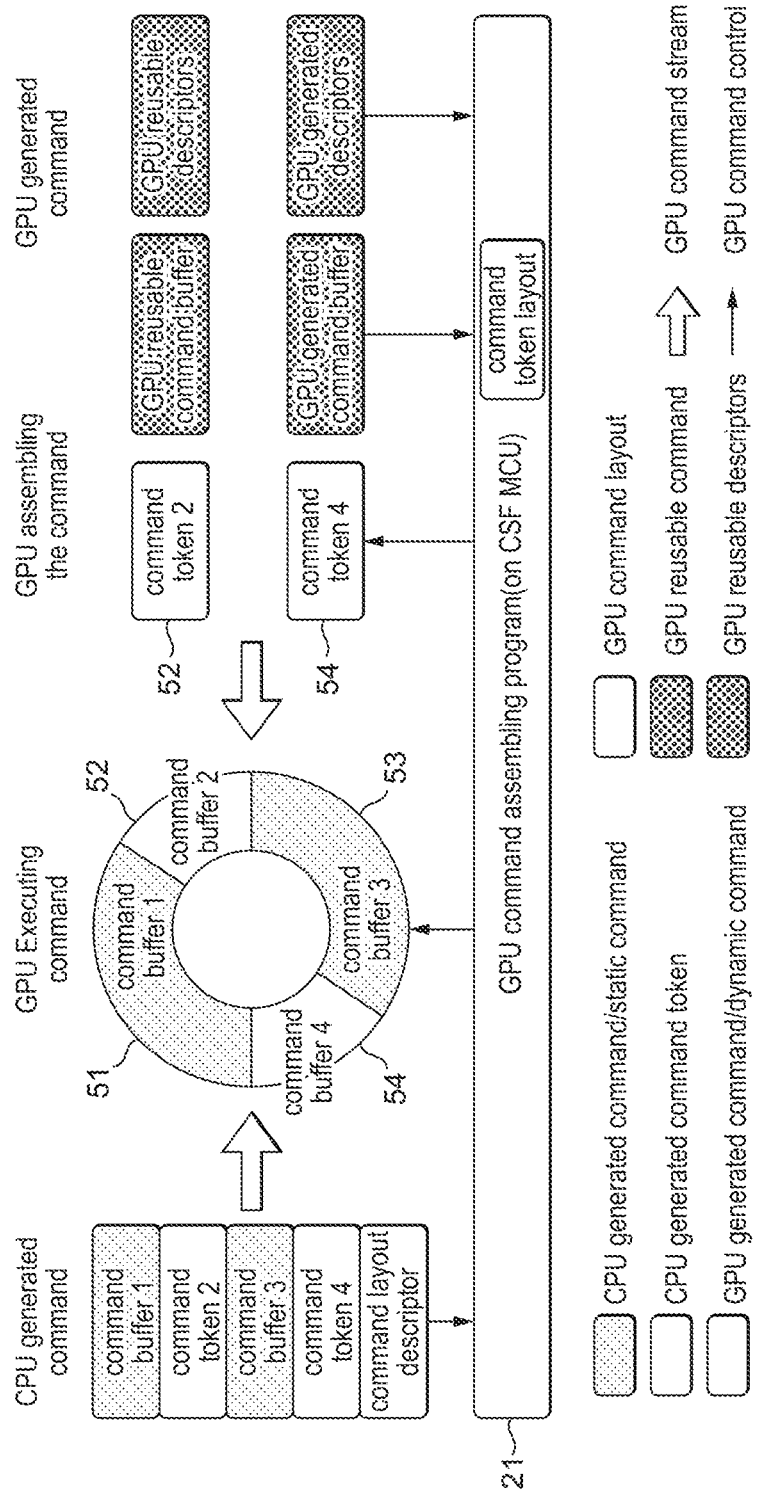
FIG. 5 shows further details of the command stream generation approach according to the FIG. 4 embodiment.
Figure 6:
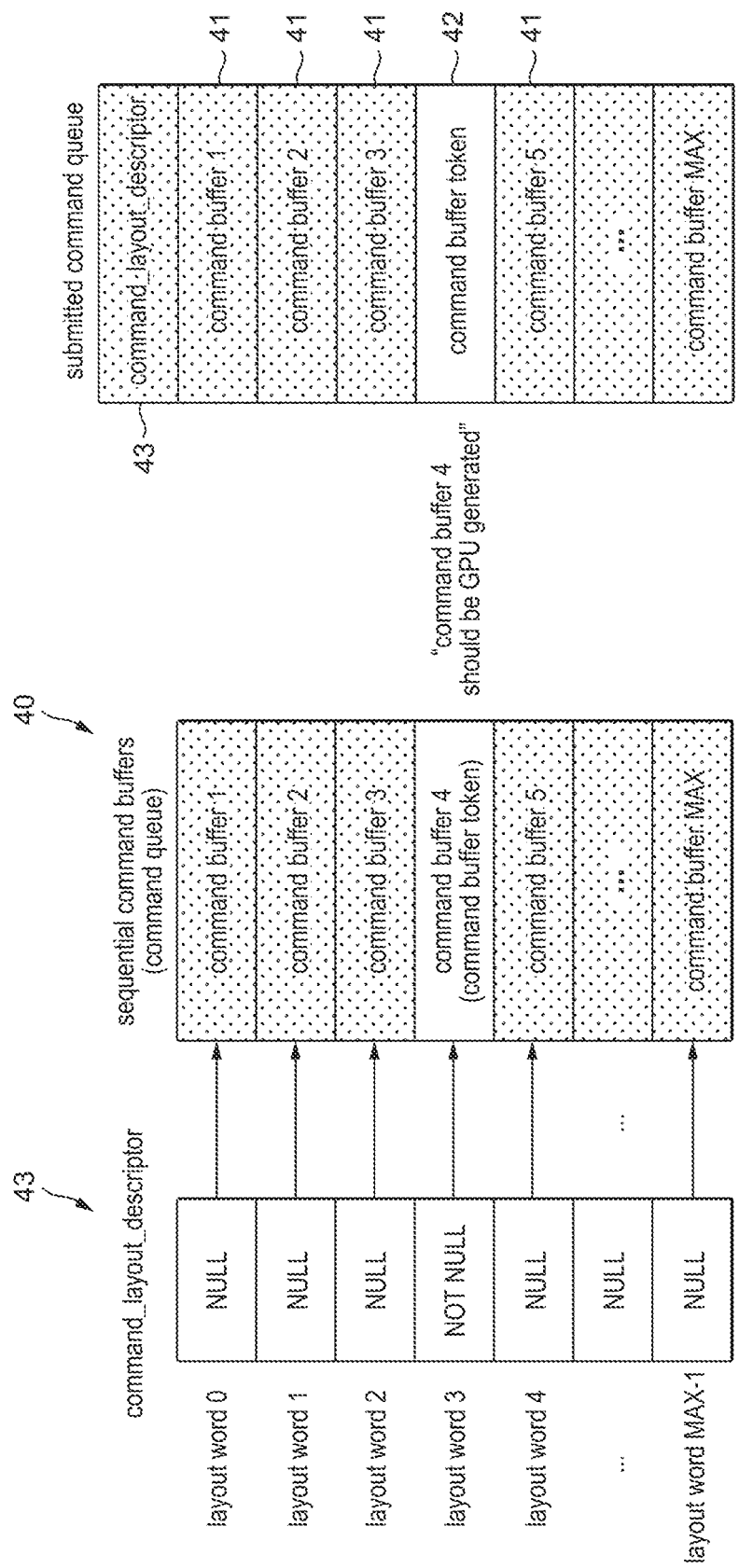
FIG. 6 shows schematically the structure of a command "token" an embodiment.

This is illustrated in further detail FIG. 5 which shows the assembled command tokens 52, 54 being included into the command stream buffer 44 at appropriate positions within the overall command stream (relative to the other commands 51, 53). [0234] FIG. 6 shows the structure of a command stream layout 40 and command layout descriptor 43 in more detail. As shown in FIG. 6, the command layout descriptor 43 includes a number of data entries that indicate whether or not a command at a corresponding position in the sequence of commands indicated by the command stream layout 40 is a command ("token") that requires command stream generation to be performed by the graphics processor 3.

The command layout descriptor 43 may thus be structured as follows:

```
Struct command_token_layout            //command layout for each submission, represent the cmd buffer order and types in single submission
{
  layout_word              //word array, each word represent a command buffer's {type, descriptor_set size, command_buffer_length}
                           // NULL: CPU generated command buffer; NOT_NULL: GPU generated command buffer
  {
    UINT8 command_buffer_type;       //8 bit represent command buffer types: graphics, compute, transport etc, or more types.
    UINT16 descriptor_set_size;      //16 bit represent descriptor set "size" of descriptor_set[SIZE] in command buffer token
    UINT16 command_buffer_length;    //16 bit represent "length" of command buffer[LENGTH] in command buffer token
    UINT16 preserved;                // preserved value or flags for command buffer layout information
  } [MAX_CMD_BUFFS_submitted];       // Each element mapping to a unique command buffer in array index order
}
```

Other arrangements would of course be possible.

In the example of FIG. 6, the fourth command in the sequence is a command "token", and this is indicated accordingly by the command layout descriptor 43. The command layout descriptor 43 is then provided to the graphics processor 3 at the head of the command stream layout 40 and when the graphics processor 3 is storing a command stream corresponding to the command stream layout 40 in its command stream buffer ring 44, the command stream supervisor (controller) 21 of the graphics processor 3 can identify from the command layout descriptor 43 that the fourth command in the sequence should be generated by the graphics processor 3, which can then trigger the graphics processor 3 to check the command "token" that is included as the fourth command in the command stream, and then perform the required command stream generation work accordingly.

In this example, the command layout descriptor 43 thus indicates to the graphics processor 3 that command generation work is required (by indicating that a command "token" is present in the command stream), with the type of command generation work being specified by the corresponding command "token".

It will be appreciated that FIG. 6 merely shows one example but there are various ways this can be done. For instance, the command stream supervisor (controller) 21 may be operable to parse the command stream corresponding to the command stream layout 40 that is provided to the graphics processor 3 to identify the presence of such command tokens 42. That is, the command stream supervisor (controller) 21 when storing a command stream may be operable to 'look ahead' through the sequence of commands to identify any commands that need to be generated by the graphics processor 3. In that case, it may not be necessary to provide a command layout descriptor 43 explicitly indicating this, as the command tokens themselves may be used to indicate that command stream generation work is required. Alternatively, the command token 42 (or descriptors thereof) may be provided directly to the command stream supervisor (controller) 21, e.g. as separate side channel information, to trigger the command stream assembly program, with the result then being assembled into the correct position in the command stream as determined by the command stream layout. Other arrangements would of course be possible.

Thus, in the embodiments described above, at least some of the final command stream assembly is performed by the graphics processor 3 at run-time.

A benefit of this approach is that the graphics processor 3 is able to re-use existing information or resources in order to populate the command tokens 42. The command tokens 42 thus in an embodiment include one or more descriptors of data or resources that are available at the graphics processor 3 and that are then used (and re-used) to populate the command tokens 42 as and when required. For instance, there may be existing resources (command buffers, descriptors, programs) that can be re-used to populate different command tokens 42, and which can be identified using suitable descriptors included within the command token 42. For example, as shown in FIG. 4, when the graphics processor 3 is triggered to perform command stream generation work for a geometry processing command may re-use vertex attribute descriptors in order to generate a correspond executable command. Likewise, when generating a fragment processing command may re-use texture descriptors. The graphics processor 3 may also be configured to re-use various shader programs or shader resource tables when generating different commands.

The command token 42 is thus essentially a template form that comprises some stateless data and static arguments and constant parameters (that are to be used as part of the command assembly), and some empty dynamic data segments which need the graphics processor 3 to generate the commands and the descriptors to populate an executable command. When it is indicated to the graphics processor 3 that the command stream includes such command tokens 42, which require the graphics processor 3 to generate a corresponding executable command, the graphics processor 3 can thus use the information included in the command token 42 to generate the corresponding command.

Again, there are various ways this can be done.

The graphics processor 3 then assembles the command stream corresponding to the command stream layout by including the populated command tokens into the command stream ring buffer 44 at the appropriate positions indicated by the command layout descriptor 43.

As the command stream corresponding to the command stream layout 40 is populated, the commands can then be executed from within the command stream ring buffer 44 in order to cause the graphics processor 3 to perform the desired processing tasks for the application.

Thus, in FIG. 4, the driver 4 on the host processor 1 not only builds commands 41 for execution but also builds command tokens 42 which are templates to indicate commands which should be generated by the graphics processor 3. Furthermore, the driver 4 also includes the command tokens 42 within the overall command steam layout 40 at the appropriate positions, to indicate the command sequence order, and generates a command layout descriptor 43 to indicate this to the graphics processor 3.

The graphics processor 3 in response to receiving the command buffer tokens 42 then executes the command assembling program that is responsible for assembling the final executable command buffers into the command ring buffer 44 for execution.

The command assembling on the graphics processor 3 thus involves two main steps.

In a first main step, the graphics processor 3 generates an executable command from the command token 42. To do this, the command assembling program executing on the graphics processor 3 will parse the command token 42 to determine the information (the command type, descriptor layout, etc.) required to populate and assemble the full command.

In a second main step, the graphics processor 3 assembles the executable commands and includes the assembled commands appropriately into the command stream ring buffer 44. For instance, after an executable command has been populated from the command token 42, the command (command stream data) then needs to be inserted into the full command stream at the appropriate position.

The graphics processor can use the descriptor of the command stream layout 43 to achieve this, as the command stream layout indicates the execution sequence of both the command buffers and the command tokens in the full command stream. In this way, all of the desired commands for the command stream, including those that have been assembled on the graphics processor 3 side from the command tokens 42, can be assembled correctly into the full command stream to be executed by the graphics processor 3.

Various other arrangements would be possible for causing the graphics processor 3 to perform command stream generation work.

Figure 7:
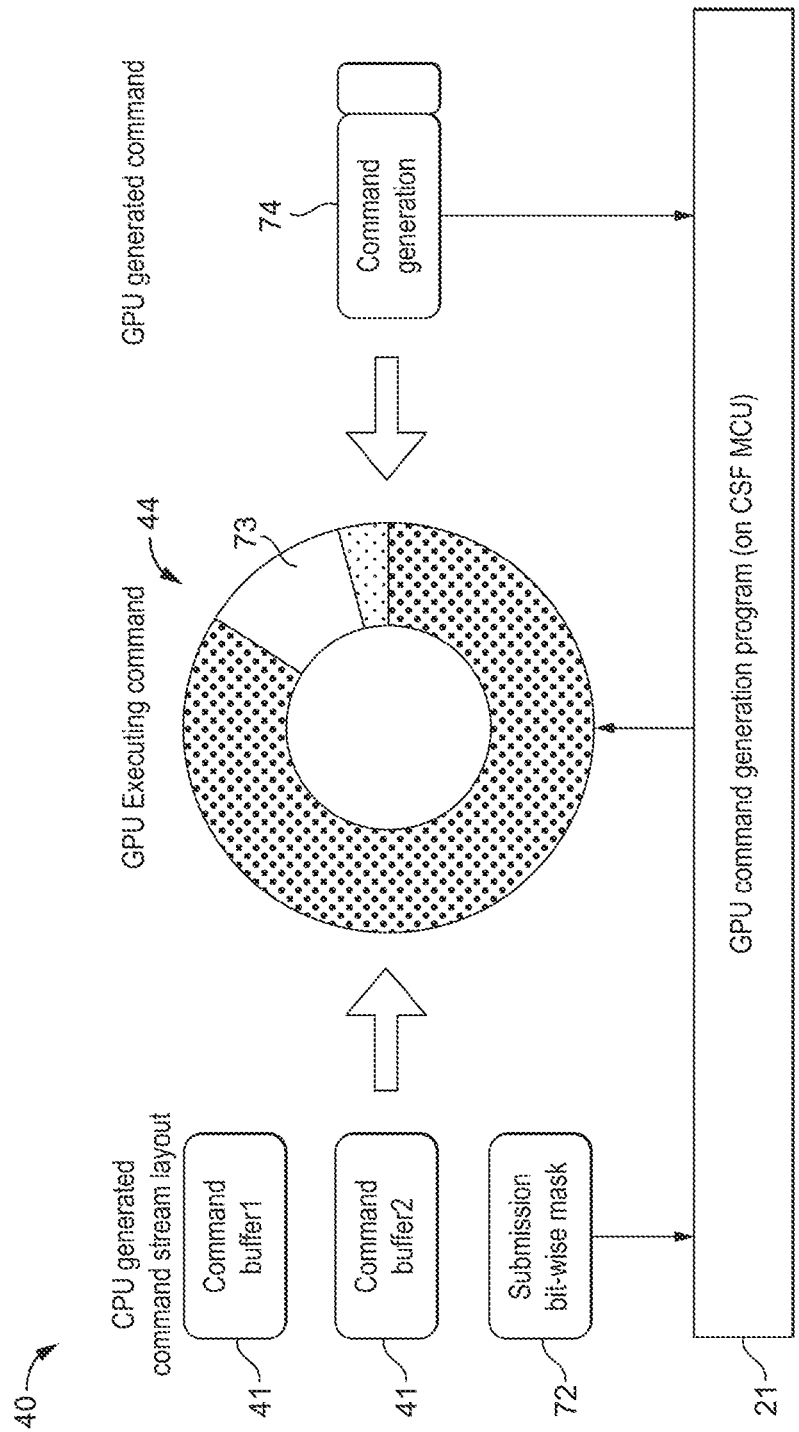
FIG. 7 shows schematically an approach to command stream generation another embodiment.

For example, FIG. 7 shows another embodiment where the driver 4 on the host processor 1 side generates a command stream layout 40 that includes, as well as full commands 41, a submission bitwise mask 71 that is used as an indicator for causing the graphics processor 3 to perform command stream generation work. In this case, the submission bitwise mask 71 may be provided to the command stream supervisor (controller) 21 and used to identify instances where an executable command should be generated by the graphics processor 3 and included into the command stream corresponding to the command stream layout 40. This is illustrated in more detail in FIG. 8 which shows an example of the use of a bitwise mask 71 to indicate which commands in the sequence of commands indicated by the command stream layout 40 need to be generated by the graphics processor 3. Thus, in the example shown in FIG. 8, the fourth bit value (bit3) is set, to indicate that the fourth command in the sequence of commands indicated by the command stream layout 40 needs to be generated by the graphics processor.

Figure 8:
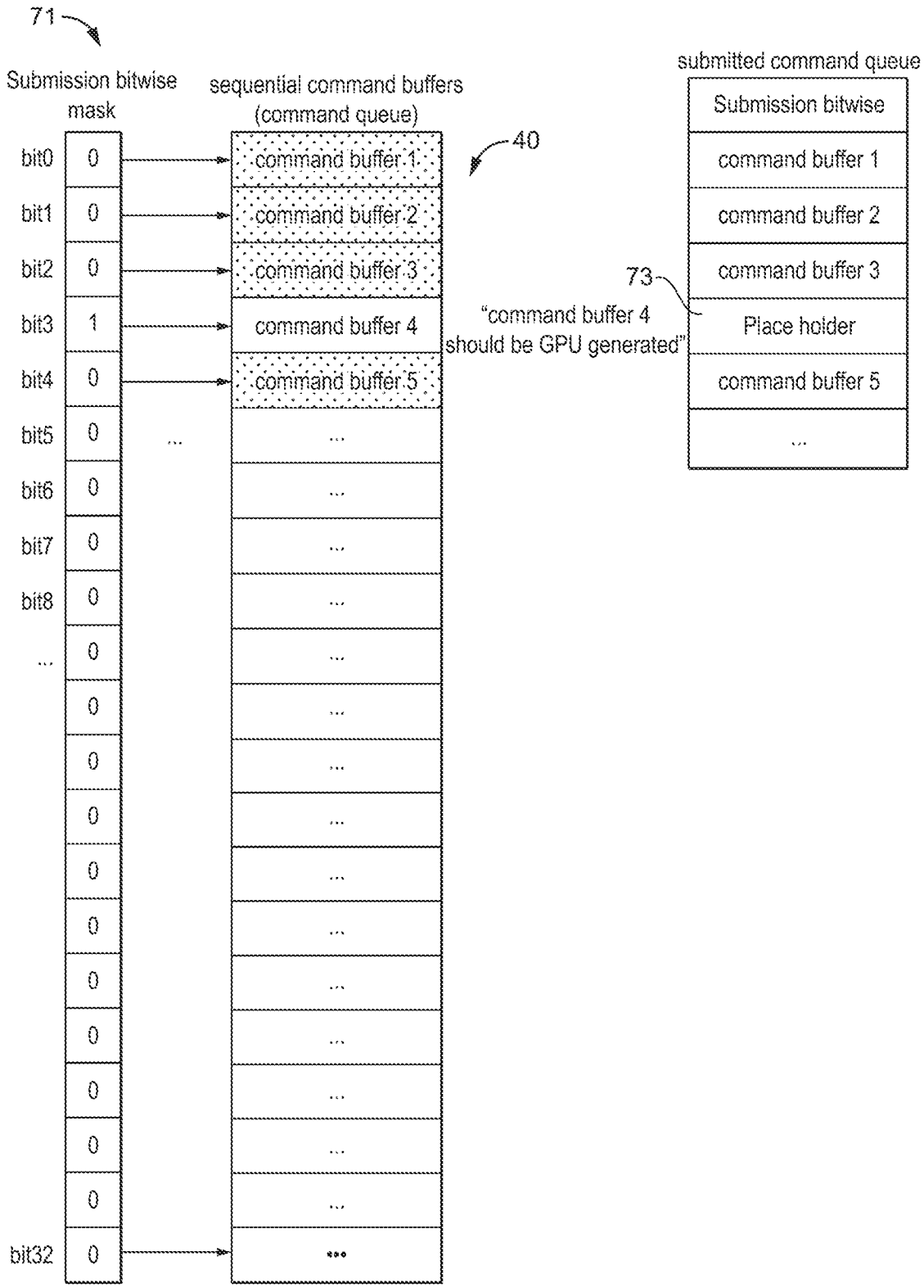
FIG. 8 shows a bitwise mask that may be used according to the FIG. 7 embodiment.

The command stream layout 40 is thus provided to the graphics processor 3 accordingly, together with the bitwise mask 71 indicating where command stream generation is required in respect of the commands indicated by the command stream layout 40. When the command stream corresponding to the command stream layout is being stored in the command stream ring buffer 44, a suitable placeholder command 73 is thus included in the command stream at the position indicated in the command stream layout 40 (as shown in FIG. 8).

The command stream supervisor (controller) 21 then performs the required command stream generation work, and the generated command 74 is then written into the command stream ring buffer 44 at the appropriate position of the placeholder command 73.

The submission bitwise mask 71 has bit values that can be set to indicate that a particular command indicated in the command stream layout needs to be generated by the graphics processor 3, and hence to cause the graphics processor 3 to perform appropriate command stream generation work. The submission bitwise mask 71 is thus generated at the host processor 1 side and then provided to the graphics processor 3 appropriately to trigger the generation of suitable command stream data for inclusion into the full command stream.

There are various ways the bitwise mask may be provided to the graphics processor 3 to trigger the command stream generation work. For example, as shown in FIG. 7, the bitwise mask 71 may be provided directly to the command stream frontend 20, separately to the command stream layout 40. However, the bitwise mask 71 could also be provided as part of the command stream layout 40 itself.

Figure 9:
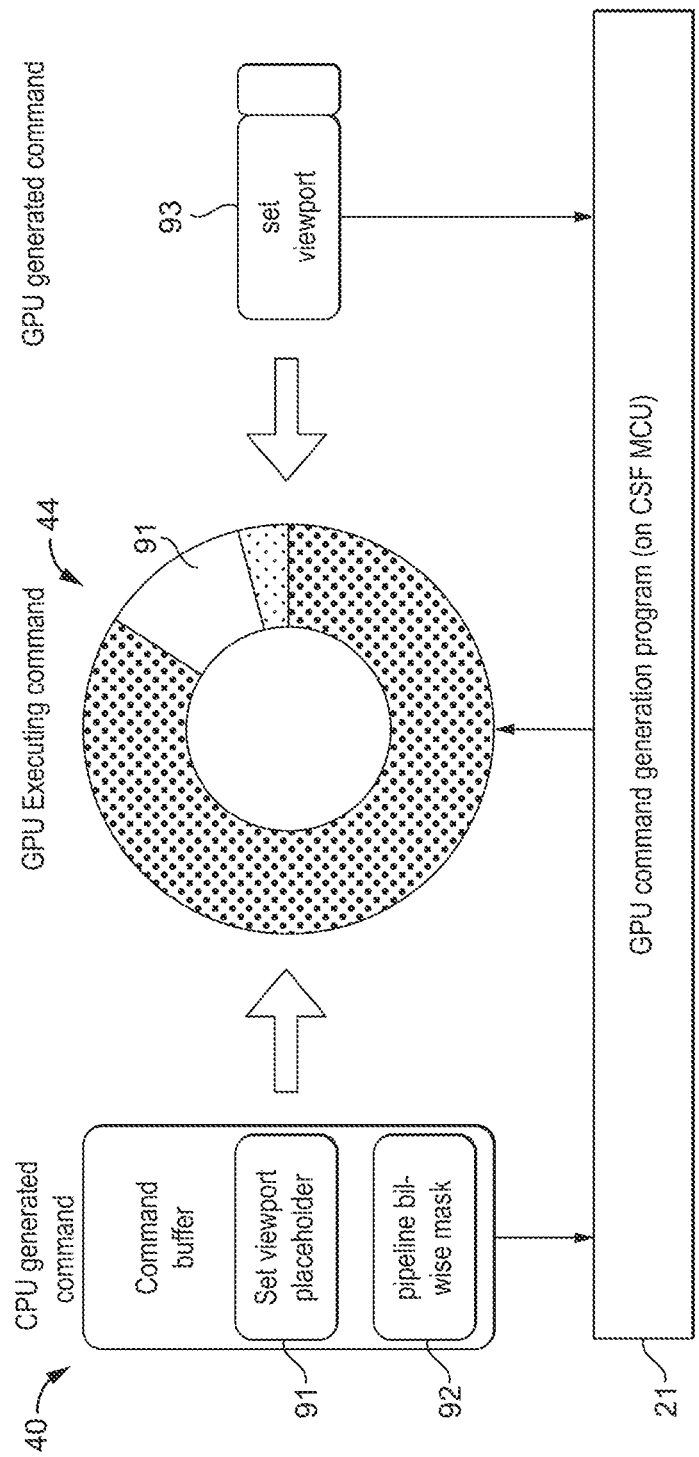
FIG. 9 shows schematically another approach to command stream generation a further embodiment.

FIG. 9 shows another example where a bitwise mask 92 is used to cause the graphics processor 3 to generate an executable command. In this case, the bitwise mask 92 is included within the command stream layout 40, together with a placeholder command 91. The command stream layout 40 is thus provided to the graphics processor 3, and the graphics processor 3 is caused to store a corresponding command stream in its command stream ring buffer 44, including an empty command at the position of the placeholder command 91, in a similar manner as described above.

Figure 10:
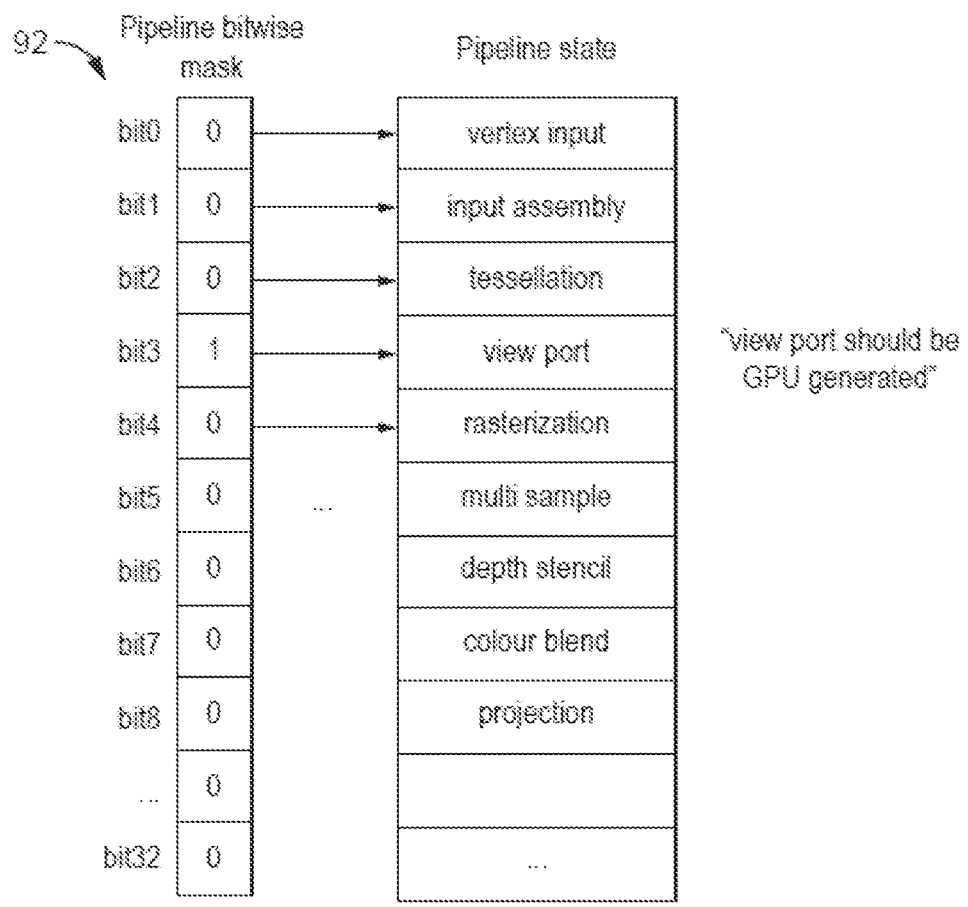
FIG. 10 shows a bitwise mask that may be used according to the FIG. 9 embodiment.

In this example, however, the bitwise mask 92 is used to indicate the type of command that is to be generated, as shown in FIG. 10. The bit values are thus set accordingly to trigger the graphics processor 3 to perform one or more types of command generation work. In the example shown in FIG. 10, for instance, the fourth bit (bit3) is set, to indicate that the 'set view port' command should be generated by the graphics processor 3. The command stream supervisor (controller) 21 is thus caused to generate a set view port command 93 which is then written into the command stream ring buffer 44 appropriately at the position of the corresponding placeholder command 91, as indicated in the command stream layout 40.

Thus, again, in these examples, the host processor 1 is configured to provide the graphics processor 3 with all of the information required to assemble the full command stream for execution, thereby allowing at least some of the command stream generation to be performed on the graphics processor 3 side, thus reducing latency, etc.

Figure 11:
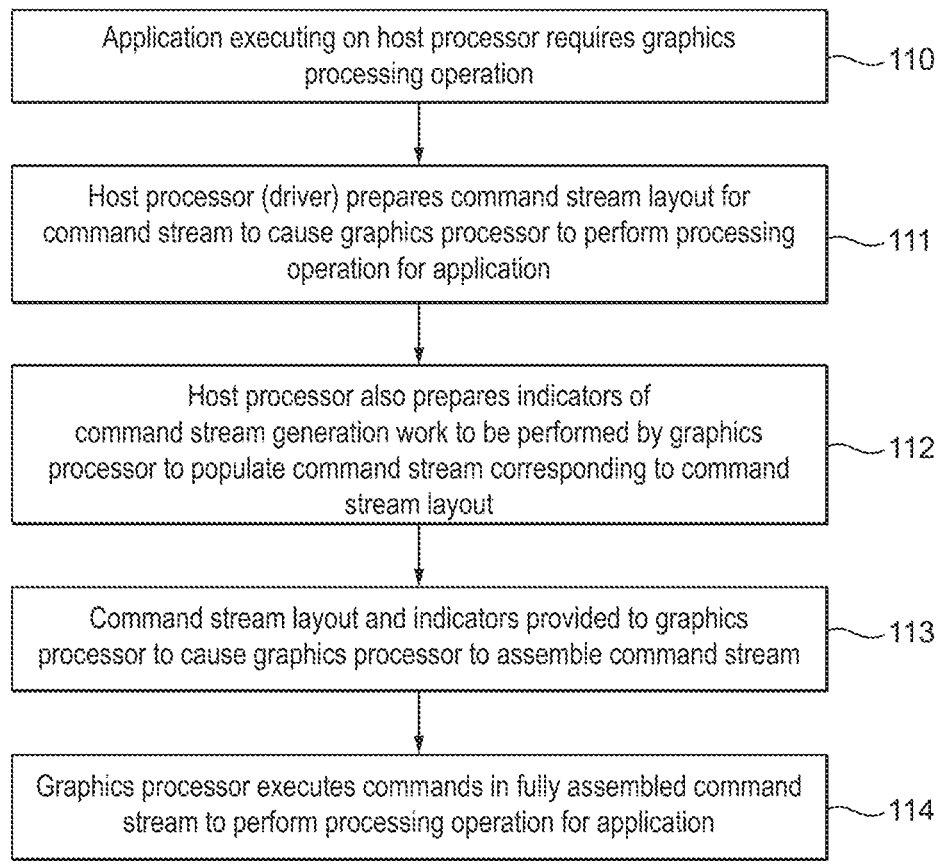
FIG. 11 is a flow chart illustrating a method according to the technology described herein.

FIG. 11 is a flow chart illustrating the overall method according to embodiments of the technology described herein. As shown in FIG. 11, when an application 2 executing on the host processor 1 requires graphics processing work to be performed by the graphics processor 3 (step 110), the driver 4 on the host processor 1 side prepares a command stream layout indicating a sequence of commands for a command stream for the graphics processor 3 accordingly (step 111). The sequence of commands indicated in the command stream layout may, and typically does, include at least some fully executable commands, e.g. that are prepared by the host processor 1, e.g. in the normal way. However, according to the technology described herein, the command stream layout also indicates some commands that are to be generated by the graphics processor 3. Thus, at the same time as preparing the command stream layout, the host processor 1 also generates one or more indicators of command stream generation work that is to be performed by the graphics processor 3 in order to populate the command stream corresponding to the command stream layout (step 112). These indicators may take any suitable form, as desired, e.g. as described above for the various illustrated examples.

The command stream layout and indicators, in whatever form they take, are then submitted to the graphics processor 3 (step 113) and the graphics processor 3 is caused to store a command stream corresponding to the command stream layout in a suitable command stream buffer (within the command stream frontend 20) for execution. Thus, the graphics processor may add the commands indicated in the command stream layout into the command stream buffer, in the indicated order, with the graphics processor 3 (the command stream frontend 20) then executing the commands appropriately to perform the graphics processing task that the command stream relates to (step 114), As part of this, in response to the indicators of command stream generation work provided by the host processor 1 (step 113), the graphics processor 3 is caused to perform the indicated command stream generation work in order to generate some of the command stream data (i.e. commands) within the command stream. For example, as mentioned above, this may involve generating command stream data for inclusion into a suitable command "token" that has been included into the command stream, with the command "token" being an empty or stateless command that needs to be populated with data generated by the graphics processor 3 to generate an executable command in the desired command stream format, and for which a suitable template for command stream generation work is prepared by the host processor 1, and indicated accordingly in the command stream layout to cause the graphics processor 3 to populate the command "token". Other arrangements would however be possible. The resulting command stream data (the populated command) is thus then written into the command stream buffer at the appropriate position to assemble the full command stream (step 113), and executed as part of the command stream execution (step 114).

Whilst a number of examples have been provided above, various other arrangements would of course be possible for causing the graphics processor 3 (or, generally, any other suitable processing resource of a data processing system) to perform some of the command stream generation work.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a data processing system that comprises a host processor and a processing resource operable to execute data processing tasks for applications executing on the host processor, the method comprising:
preparing, on the host processor, in response to receiving a request for data processing to be executed by the processing resource from an application executing on the host processor, a command stream layout, the command stream layout indicating a sequence of commands for a command stream for execution by the processing resource to cause the processing resource to execute processing tasks for the application, wherein preparing the command stream layout comprises the host processor generating one or more indicators of command stream generation work that is to be executed by the processing resource to populate the command stream corresponding to the command stream layout for execution by the processing resource, wherein the one or more indicators trigger the processing resource to execute command stream generation work to generate command stream data for inclusion into the command stream corresponding to the command stream layout;
providing, by the host processor, the command stream layout and the one or more indicators of command stream generation work to the processing resource;
storing, by the processing resource, a command stream corresponding to the command stream layout in a command stream buffer for execution; and
executing, by the processing resource and corresponding to the command stream layout, the commands in the command stream from within the command stream buffer to execute processing tasks for the application, wherein the storing comprises:
in response to the processing resource receiving the one or more indicators from the host processor:
executing, by the processing resource, the indicated command stream generation work to generate command stream data for inclusion into the command stream; and
writing, by the processing resource, the generated command stream data into the command stream in the command stream buffer corresponding to the command stream layout for execution by the processing resource.

2. The method of claim 1, wherein the command stream layout further indicates one or more command templates representing commands in the corresponding command stream that are to be generated by the processing resource, wherein a command template comprises a set of empty data segments that are to be populated with command stream data generated by the processing resource.

3. The method of claim 2, wherein the command template comprises a set of descriptors of data and/or resources available to the processing resource that are to be used when generating the command stream data.

4. The method of claim 2, wherein the command stream layout further comprises a partial command stream that is stored by the processing resource in the command stream buffer for execution, the command stream layout including one or more commands that have been prepared in full by the host processor and one or more command templates indicating commands that are to be populated with command stream data generated by the processing resource.

5. The method of claim 2, wherein the one or more indicators of command stream generation work indicate the presence and position of the command templates within the command stream corresponding to the command stream layout.

6. The method of claim 2, wherein the one or more command templates included within the command stream layout themselves act as respective indicators of command stream generation work, and wherein the method further comprises parsing, by the processing resource, the command stream layout to identify instances where command stream generation work is required to be executed.

7. The method of claim 1, wherein the processing resource is configured to execute a set of one or more pre-set command stream generation tasks to generate command stream data, and wherein in response to the one or more indicators, the processing resource is configured to execute one or more of the pre-set command stream generation tasks.

8. The method of claim 1, wherein the processing resource is a graphics processor operable to execute graphics processing tasks for the host processor, and wherein the command stream generation work generates executable commands for storing in the command stream buffer that when executed by the graphics processor causes the graphics processor to execute a graphics processing task.

9. The method of claim 1, wherein the processing resource comprises a command stream processing circuit that is operable to schedule processing work to execution units of the processing resource and wherein the command stream processing circuit includes a controller that is operable to receive the command stream layout and the one or more indicators of command stream generation work provided by the host processor, and when the controller within the command stream processing circuit identifies an indicator of command stream generation work that is to be executed by the processing resource: triggering, by the controller, the processing resource to execute the command stream generation work to generate the command stream data for inclusion into the command stream corresponding to the provided command stream layout.

10. The method of claim 9, wherein when command stream generation work needs to be executed by the processing resource, assembling executable commands for inclusion into the command stream corresponding to the provided command stream layout.

11. A method of operating a processing resource of a data processing system, the processing resource being operable to execute processing tasks for applications executing on a host processor of the data processing system, the method comprising:
receiving, by the processing resource and from a host processor of the data processing system, a command stream layout, the command stream layout indicating a sequence of commands for a command stream for execution by the processing resource to cause the processing resource to execute processing tasks for the applications;
receiving, by the processing resource and from the host processor, one or more indicators of command stream generation work that is to be executed by the processing resource to populate the command stream corresponding to the command stream layout;
storing, by the processing resource, the command stream in a command stream buffer corresponding to the command stream layout; and
executing, by the processing resource, commands in the command stream from within the command stream buffer corresponding to the command stream layout to execute processing tasks for the applications, wherein the storing comprises:
in response to the processing resource receiving the one or more indicators from the host processor:
executing, by the processing resource, the indicated command stream generation work to generate command stream data for inclusion into the command stream; and
writing, by the processing resource, the generated command stream data into the command stream in the command stream buffer according to the command stream layout for execution by the processing resource.

12. A data processing system that comprises:
a host processor;
a processing resource operable to execute data processing tasks for applications executing on the host processor;
the host processor comprising a command stream generating circuit that is configured to prepare, in response to receiving a request for data processing to be executed by the processing resource from an application executing on the host processor, a command stream layout, the command stream layout indicating a sequence of commands for a command stream for execution by the processing resource to cause the processing resource to execute processing tasks for the application;
wherein preparing the command stream layout comprises the host processor generating one or more indicators of command stream generation work that is to be executed by the processing resource to populate the command stream corresponding to the command stream layout for execution, wherein the one or more indicators trigger the processing resource to execute command stream generation work to generate command stream data for inclusion into the command stream corresponding to the command stream layout;
the host processor further comprising a processing circuit configured to provide the command stream layout and the one or more indicators of command stream generation work to the processing resource;
the processing resource comprising:
a command stream buffer for storing the command stream corresponding to the command stream layout provided by the host processor for execution; and
a processing circuit configured to, in response to receiving the one or more indicators provided by the host processor of command stream generation work to be executed by the processing resource, populate the command stream corresponding to the command stream layout;
the processing resource further operable to:
execute the indicated command stream generation work to generate command stream data for inclusion into the command stream corresponding to the command stream layout; and
write the generated command stream data into the command stream in the command stream buffer corresponding to the command stream layout for execution by the processing resource; and
a command stream execution circuit that is configured to execute commands in the command stream from within the command stream buffer corresponding to the command stream layout to execute processing tasks for the application.

13. The system of claim 12, wherein the command stream layout prepared by the host processor indicates one or more command templates for the command stream for execution by the processing resource, wherein a command template comprises a set of empty data segments that are to be populated with command stream data generated by the processing resource.

14. The system of claim 13, wherein the one or more command templates comprise a set of descriptors of data and/or resources available to the processing resource that are to be used when generating the command stream data.

15. The system of claim 13, wherein the command stream layout comprises a partial command stream that is stored by the processing resource in the command stream buffer for execution, the command stream including one or more commands that have been prepared in full by the host processor and one or more command templates indicating commands that are to be populated with command stream data generated by the processing resource.

16. The system of claim 13, wherein the one or more indicators of command stream generation work indicate the presence and position of the one or more command templates within the command stream corresponding to the command stream layout.

17. The system of claim 13, wherein the one or more command templates included within the command stream layout themselves act as respective indicators of command stream generation work, and wherein the processing resource is configured to parse the command stream layout to identify instances where command stream generation work is required to be executed.

18. The system of claim 12, wherein the processing resource is configured to execute a set of one or more pre-set command stream generation tasks to generate command stream data, and wherein in response to the one or more indicators, the processing resource is configured to execute one or more of the pre-set command stream generation tasks.

19. The system of claim 12, wherein the processing resource comprises a command stream processing circuit that is operable to schedule processing work to execution units of the processing resource and wherein the command stream processing circuit includes a controller that is operable to receive the command stream layout and the one or more indicators of command stream generation work provided by the host processor, the controller within the command stream processing circuit executing a command stream assembly program including instructions to determine command stream generation work that needs to be executed by the processing resource and to then assemble executable commands for inclusion into the command stream corresponding to the provided command stream layout.

20. The system of claim 12, wherein the processing resource is a graphics processor operable to execute graphics processing tasks for the host processor, and wherein the command stream generation work generates executable commands for storing in the command stream buffer that when executed by the graphics processor will cause the graphics processor to execute a graphics processing task.

* * * * *